(12) United States Patent
Imai et al.

(10) Patent No.: US 7,552,912 B2
(45) Date of Patent: Jun. 30, 2009

(54) FLUID PRESSURE DEVICE

(75) Inventors: Atsushi Imai, 1-24, Miyado 1-chome, Asaka-shi, Saitama 351-0031 (JP); Akira Imai, 1-24, Miyado 1-chome, Asaka-shi, Saitama 351-0031 (JP); Yutaka Imai, 1-24, Miyado 1-chome, Asaka-shi, Saitama 351-0031 (JP); Tatsuo Goda, Tokyo (JP)

(73) Assignees: Atsushi Imai, Asaka-shi, Saitama (JP); Akira Imai, Asaka-shi, Saitama (JP); Yutaka Imai, Asaka-shi, Saitama (JP); Tooru Imai, Asaka-shi, Saitama (JP); Satoshi Imai, Asaka-shi, Saitama (JP)

(*) Notice: Subject to any disclaimer, the term of this patent is extended or adjusted under 35 U.S.C. 154(b) by 38 days.

(21) Appl. No.: 10/545,248

(22) PCT Filed: Apr. 22, 2003

(86) PCT No.: PCT/JP03/05102

§ 371 (c)(1),
(2), (4) Date: Jul. 24, 2006

(87) PCT Pub. No.: WO2004/070216

PCT Pub. Date: Aug. 19, 2004

(65) Prior Publication Data

US 2007/0051101 A1 Mar. 8, 2007

(30) Foreign Application Priority Data

Feb. 10, 2003 (JP) ............................. 2003-032269

(51) Int. Cl.
*E04G 21/12* (2006.01)
(52) U.S. Cl. .................. 254/29 A; 269/32; 254/93 R
(58) Field of Classification Search ................ 254/29 A, 254/93 H, 93 R; 81/57.38; 269/24, 27, 32
See application file for complete search history.

(56) References Cited

U.S. PATENT DOCUMENTS

| | | | |
|---|---|---|---|
| 4,062,254 A | 12/1977 | Fredriksson | 81/57.38 |
| 4,708,036 A * | 11/1987 | Vossbrinck | 81/57.38 |
| 4,840,526 A | 6/1989 | Bourdonné | 411/263 |
| 4,998,453 A * | 3/1991 | Walton et al. | 81/57.38 |
| 5,527,015 A * | 6/1996 | Percival-Smith | 254/29 A |
| 5,690,458 A | 11/1997 | Junkers | 411/432 |

(Continued)

FOREIGN PATENT DOCUMENTS

| | | |
|---|---|---|
| GB | 2 263 739 A | 8/1993 |
| JP | 51-8151 | 1/1976 |
| JP | 52-22654 | 2/1977 |

(Continued)

OTHER PUBLICATIONS

European Search Report for Serial No. EP 03 72 5620 dated Mar. 7, 2006.

*Primary Examiner*—Lee D Wilson
(74) *Attorney, Agent, or Firm*—McCormick, Paulding & Huber LLP

(57) ABSTRACT

A fluid pressure nut 16 has a first load supporting member 17 disposed in a flange 13a and a second load supporting member 18 axially movably attached to the first load supporting member 17, wherein the second load supporting member 18 is screw-connected to a bolt 15 in a screw hole 28. A pressure chamber is provided between the first load supporting member 17 and the second load supporting member 18, and a seal ring 44 is attached to an end portion of a pressure chamber 27. The seal ring 44 includes a first curve portion contacting with the first load supporting member 17, a second curve portion contacting with the second load supporting member 18, and a pressure receiving portion continuing into the first and second curve portions, wherein pressure applied to the pressure receiving portion is converted into axial-directional sealing forces of the curve portions.

31 Claims, 16 Drawing Sheets

U.S. PATENT DOCUMENTS

| | | | |
|---|---|---|---|
| 5,803,436 A * | 9/1998 | Hohmann et al. | 254/29 A |
| 6,736,384 B2 * | 5/2004 | Yokota | 269/32 |
| 2006/0202401 A1 * | 9/2006 | Shinozaki | 269/27 |
| 2007/0051101 A1 * | 3/2007 | Imai et al. | 60/422 |

FOREIGN PATENT DOCUMENTS

| | | |
|---|---|---|
| JP | 54-108860 | 7/1979 |
| JP | 59-155315 | 10/1984 |
| JP | 59-180166 | 10/1984 |
| JP | 62-261705 | 11/1987 |
| JP | 63-106960 | 7/1988 |
| JP | 02-300508 | 12/1990 |
| JP | 6-264909 | 9/1994 |
| JP | 3012347 | 4/1995 |
| JP | 2000-504401 | 4/2000 |
| JP | 2002-538389 | 11/2002 |
| WO | 00/65243 | 11/2000 |

\* cited by examiner

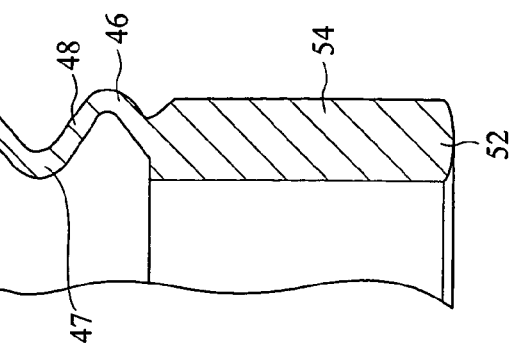
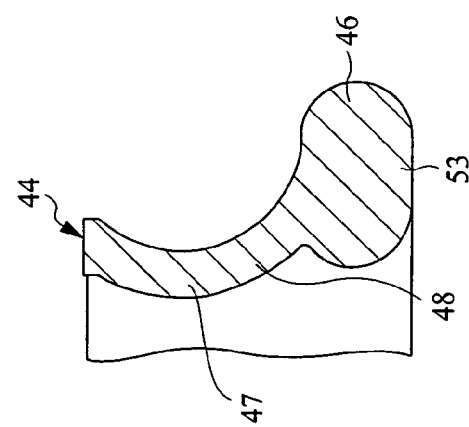
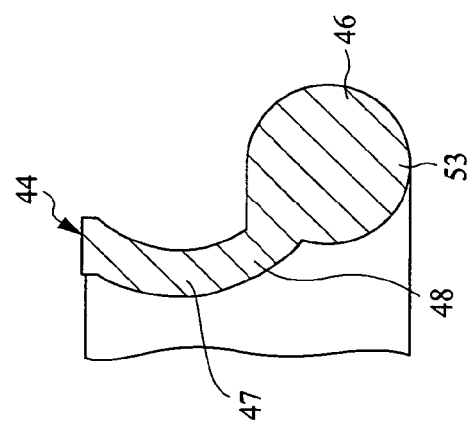
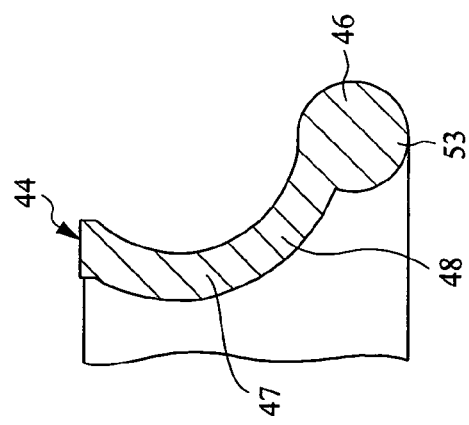

FLUID PRESSURE DEVICE

CROSS REFERENCE TO RELATED APPLICATIONS

This application is entitled to the benefit of and incorporates by reference essential subject matter disclosed in International Patent Application No. PCT/JP2003/005102 filed on Apr. 22, 2003 and Japanese Patent Application No. 2003-32269 filed Feb. 10, 2003.

FIELD OF THE INVENTION

The present invention relates to a fluid pressure device which converts energy of a working medium into mechanical energy, and in particular, it relates to a fluid pressure device which is screw-fastened on a bolt inserted into an insertion hole of a fastened member in a state applied with a tensile force in advance.

BACKGROUND OF THE INVENTION

In general, a fluid pressure device supplies a working medium such as working oil and the like into a pressure chamber formed by a cylinder and a piston axially movably mounted with this cylinder with a predetermined pressure or increases the pressure by applying a load to the working medium sealed into the pressure chamber, thereby converting the energy of the working medium into the mechanical energy, that is, a driving force of the piston. To prevent a leakage of oil pressure from the pressure chamber, a seal member is mounted on the sliding portion with the cylinder and the piston.

Meanwhile, heretofore, there has been frequently used a fastening method by a bolt and a nut in case a turbine case of a steam turbine or a gas turbine, which is used in the power plant of an electric power station and the like, is assembled. However, in such a fastening method, since almost all fastening torque applied to a nut oppose the rolling friction in a bearing surface, it is difficult to obtain a high fastening force by increasing an axial pressure of the bolt. Hence, in case the high fastening force is required in this manner, the fluid pressure device is incorporated, whereby there is used a fluid pressure nut which is screw-fastened in a state in which a bolt is applied with a tensile force in advance.

The fluid pressure nut comprises a circular cylinder disposed on the turbine case and a piston axially movably mounted with the cylinder and, between the cylinder and the piston, there is defined a pressure chamber. The axial center of the piston is formed with a screw hole, and this screw hole is screw-fastened on a bolt inserted into the insertion hole of the turbine case. Further, the fluid pressure nut is provided with a lock ring, and this lock ring is screw-fastened on an outer peripheral surface of the cylinder so as to be movable in a direction of approaching or being isolated from the end portion of the piston. When the oil pressure is supplied to the pressure chamber in a state in which the piston is screw-fastened on the bolt, the piston moves in a direction of being isolated from the cylinder, and applies a load in a tensile-force direction to the bolt. After that, the lock ring is rotated until a position to contact the end portion of the piston and when the oil pressure inside the pressure chamber is evacuated, the load applied to the piston is put into a state supported by the lock ring, thereby completing the fastening. In this manner, since the fluid pressure nut is screw-fastened in a state in which the bolt is applied with a tensile force, this increases an axial tension of the bolt, thereby making it possible to obtain a high fastening force.

In such a fluid pressure nut, to prevent the working medium such as the working oil and water from leaking from the pressure chamber, the end portion of the pressure chamber, that is, the sliding portion with the cylinder and the piston is provided with a seal member. Conventionally, as such a seal member, an O-ring, U-packing, X-ring, and the like are frequently used, and in this case, as the material thereof, elastic materials such as rubber, plastic, and the like are used. Even in case a gap of the sliding member increases due to pressure deflection, in conformity with the change of this gap, the seal member is elastically deformed and maintains the sealing.

However, since the turbine case has a plurality of bolts lined up and arranged with a small pitch, there are often the cases where the fluid pressure nut is limited in its outer diameter size and is unable to set a pressure receiving area of the piston large. Hence, to apply a predetermined tensile force to the bolt, the oil pressure supplied inside the pressure chamber must be increased and, in some cases, it becomes a super high pressure of 250 Mpa or more. In such a case, the seal member is unable to endure the super high pressure, and it has been difficult to prevent the leakage of the oil pressure.

In contrast to this, there has been known a turbine case in which the outer peripheral end of the piston is formed in a knife edge shape which closely contacts the cylinder or mounted with a U-cup type seal ring made of rigid plastic or metal at the end of the pressure chamber.

However, since the turbine case reaches extremely high temperature by high temperature and pressure gas involved, the fluid pressure nut fastened is exposed to high temperature environment that exceeds 500 degree. Hence, according to the sealing method using the edge portion as described above, there are often the cases where the edge portion is unable to endure the heat and is deformed, thereby lowering a sealing property. In this case, even when the oil pressure is supplied to the interior of the pressure chamber again to take out the fluid pressure nut, the pressure in the interior of the pressure chamber cannot be increased to a rated value and, therefore, taking out this fluid pressure nut is made difficult. Further, in case the pressure of the pressure chamber cannot be increased, although a step such as cutting the lock ring and the like is required, cutting only the lock ring has been not easy.

Further, on the occasion of screw-fastening the bolt and the fluid pressure nut, there are often the cases where the bolt slightly inclines. In this case, according to the turbine case in which a knife edge portion is formed on the outer peripheral end of the piston, the knife edge portion has been deformed due to inclination of the bolt, thereby lowering the sealing property.

An object of the present invention is to raise the upper limit of the oil pressure supplied to the liquid pressure device.

Another object of the present invention is to improve durability of the liquid pressure device under a high temperature environment.

SUMMARY OF THE INVENTION

A fluid pressure device according to the present invention is one for converting energy of a working medium supplied to an interior of a pressure chamber into mechanical energy and comprises: a first load supporting member; a second load supporting member relatively movably incorporated into said first load supporting member and partitioning and forming said pressure chamber together with said first load supporting member; and a metallic seal ring formed so that a first curve portion contacting with said first load supporting member and a second curve portion contacting with said second load supporting member are axially shifted, the metallic seal ring being disposed at in end portion of said pressure chamber.

A liquid pressure device according to the present invention is screw-connected in a state of applying a tensile force in advance to a bolt inserted into an insertion hole of a member to be fastened and comprises: a first load supporting member disposed in said member to be fastened; a second load supporting member having a screw hole screw-connected to said bolt and axially movably incorporated into said first load supporting member to partition and form a pressure chamber together with said first load supporting member; and a metallic seal ring formed so that a first curve portion contacting with said first load supporting member and a second curve portion contacting with said second load supporting member are axially shifted, the metallic seal ring being disposed in an end portion of said pressure chamber.

The fluid pressure device according to the present invention further comprises: a female screw portion screw-connected to a male screw portion provided on an outer circumferential surface of one of said first and second load supporting members; a load supporting surface contacting with an end surface of the other of said first and second load supporting members, wherein a lock ring for supporting a load of said second load supporting member is provided.

The fluid pressure device according to the present invention is such that a flank on a load supporting side of said male screw portion is inclined in a direction of approaching said load supporting surface from a root portion to a crest portion, and a flank on a load supporting side of said female screw portion is inclined in a direction of separating from said load supporting surface from the root portion to the crest portion.

The fluid pressure device according to the present invention is such that said lock ring is radially divisibly provided.

The fluid pressure device according to the present invention is such that, by supplying a working medium to said pressure chamber, said second load supporting member moves in a direction of separating from said first load supporting member and a tensile force is applied to said bolt.

The fluid pressure device according to the present invention further comprises: a load input piston axially slidably provided between an inner circumferential surface of said first load supporting member and an outer circumferential surface of said second load supporting member, and partitioning and forming a load input pressure chamber together with an reactive force supporting portion provided in said second load supporting member; and a load transmission piston formed in a cylindrical shape slidably contacting with the inner circumferential surface of said first load supporting member and the outer circumferential surface of said second load supporting member and being axially movable between said load input piston and said pressure chamber, wherein by supporting a load input working medium to said load input pressure chamber, a tensile force is applied to said bolt through said reactive force supporting portion and concurrently said seal ring is pressed to said load input piston through said load transmission piston to increase pressure of a working medium sealed into said pressure chamber.

The fluid pressure device according to the present invention is such that a large-diameter cylindrical portion in which said screw hole is formed and a small-diameter column portion formed smaller in diameter than said large-diameter cylindrical portion are provided in said second load supporting member, and said load input piston slidably contacts with the outer circumferential surface of said small-diameter column portion.

A liquid pressure device according to the present is screw-connected to a nut and applying in advance a tensile force to a bolt fastening a member to be fastened and comprises: a first load supporting member disposed in said member to be fastened; a second load supporting member having a screw hole screw-connected to said bolt and axially movably incorporated into said first load supporting member to partition and form a pressure chamber together with said first load supporting member; a load input piston formed in a disk shape axially movably slidably contacting with an inner circumferential surface of said first load supporting member, and partitioning and forming a load input pressure chamber together with said first load supporting member; a load transmission piston formed in a cylindrical shape slidably contacting with the inner circumferential surface of said first load supporting member and the outer circumferential surface of said second load supporting member, and being axially movable between said load input piston and said pressure chamber; and a metallic seal ring formed so that a first curve portion contacting with said first load supporting member and a second curve portion contacting with said second load supporting member are axially shifted and formed, the metallic seal ring being disposed at an end portion of said pressure chamber, wherein a load input working medium is supplied to said load input pressure chamber, and said seal ring is pressed to said load input piston through said load transmission piston to increase pressure of the working mediums sealed into said pressure chamber.

The fluid pressure device according to the present invention is such that a pressure receiving area of said load transmission piston is set smaller than that of said second load supporting member.

The fluid pressure device according to the present invention further comprises: a fastening screw member including a large-diameter male screw portion having a first lead corresponding to a large-diameter female screw portion formed in said first load supporting member and screw-connected to said large-diameter female screw portion, and a small-diameter female screw portion having a second lead larger than said first lead and screw-connected to a small-diameter male screw portion formed in said second load supporting member in the same direction as that of said large-diameter female screw portion; and a load transmission piston formed in a cylindrical shape slidable contacting with the inner circumferential surface of said first load supporting member and the outer circumferential surface of said second load supporting member and being axially movable between said fastening screw member and said pressure chamber, wherein by screwing said fastening screw member into said first load supporting member, a tensile force is applied to said bolt through said second load supporting member and concurrently said seal ring is pressed to said fastening screw member through said load transmission piston to increase pressure of a working medium sealed into said pressure chamber.

The fluid pressure device according to the present invention is such that said load transmission piston and said seal ring are integrally formed.

The fluid pressure device according to the present invention is such that a pressure receiving portion, continuing into said first and second curve portions and converting the pressure applied by said working medium into radial-directional sealing forces of said first and second curve portions, is provided in said seal ring.

The fluid pressure device according to the present invention is such that a positioning stopper, contacting with a stopper surface formed in said first load supporting member or said second load supporting member, is provided on an axial-directional side of said seal ring.

The fluid pressure device according to the present invention is such that an angle formed by said stopper surface and a straight line, which passes through a contact point between the curve portion axially further from said stopper portion in said first and second curve portions and said first or second load support portion and a contact point between said stopper portion and said stopper surface, is set to be smaller than an axial-directional angle of said straight line.

The fluid pressure device according to the present invention is such that said stopper surface is inclined in the same direction as that of a straight line, which passes through a contact point between said first curve portion and said first load supporting member and a contact point between the second curve portion and said second load supporting member.

The fluid pressure device according to the present invention is such that a restriction wall portion for restricting a radial-directional movement of said stopper portion is provided in said stopper surface.

The fluid pressure device according to the present invention is such that said seal ring is subjected to shrinkage fit or cooling fit so that the curve portion axially further from said first curve portion and said second curve portion is strongly brought into contact with said first or second load supporting member.

Thus, in the present invention, since a sealing force of the seal ring provided at the end portion of the pressure chamber can be increased, an upper limit of the oil pressure supplied to the fluid pressure device can be raised.

Further, in the present invention, since the pressure applied to the pressure receiving portion is converted into the radial-directional sealing force of the curve portions, much stronger sealing forces can be obtained.

Further, in the present invention, the curve portions are mutually axially shifted and provided, so that even when a gap between the first and second load supporting members is increased or decreased, the seal ring is totally elastically deformed into a tapered shape in addition to the elastic deformation of each curve portion. Therefore, much stronger sealing force can be obtained.

Further, in the present invention, since the seal ring contacts with the first or second load supporting member in each curve portion, the seal surface is not deformed even under a high temperature environment and durability under the high temperature environment can be enhanced.

Further, in the present invention, even if the oil pressure is unable to be raised to the specified value for some reasons, the lock ring can be disassembled so as to release an axial tension of the bolt. Therefore, this fluid pressure device can be easily taken out.

Further, in the present invention, since a flank angle on a load supporting side of the female screw portion of the lock ring is set to be minus, this fluid pressure nut can be made compact and light in weight even if the lock ring has a split structure.

Further, in the present invention, since the stopper portion of the seal ring is such that the radial-directional movement is restricted, the sealing force of the seal ring can be further increased.

Further, in the present invention, the load for applying the tensile force to the bolt can be dispersed into a load directly applied to the bolt through the second load supporting member and a load resulting from an increase of the pressure in the pressure chamber, so that the load of the seal ring can be reduced and the operation of this fluid pressure device can be made more reliable.

Further, in the present invention, since the pressure of the working medium in the pressure chamber can be made higher than that of the load input working medium supplied to the load input pressure chamber, the pressure areas of the first and second load supporting members partitioning and forming the pressure chamber can be made small. Therefore, it is possible to make this fluid pressure device compact and light in weight.

Further, in the present invention, even if the oil pressure is leaked, the sealing force is self-restored, so that the sealing force of this seal ring can be stabilized.

BRIEF DESCRIPTION OF THE DRAWINGS

FIGS. 9A to 9D are cross-sectional views showing modified examples of the seal ring shown in FIG. 7.

DETAILED DESCRIPTION OF THE PREFERRED EMBODIMENTS

Figure 1:
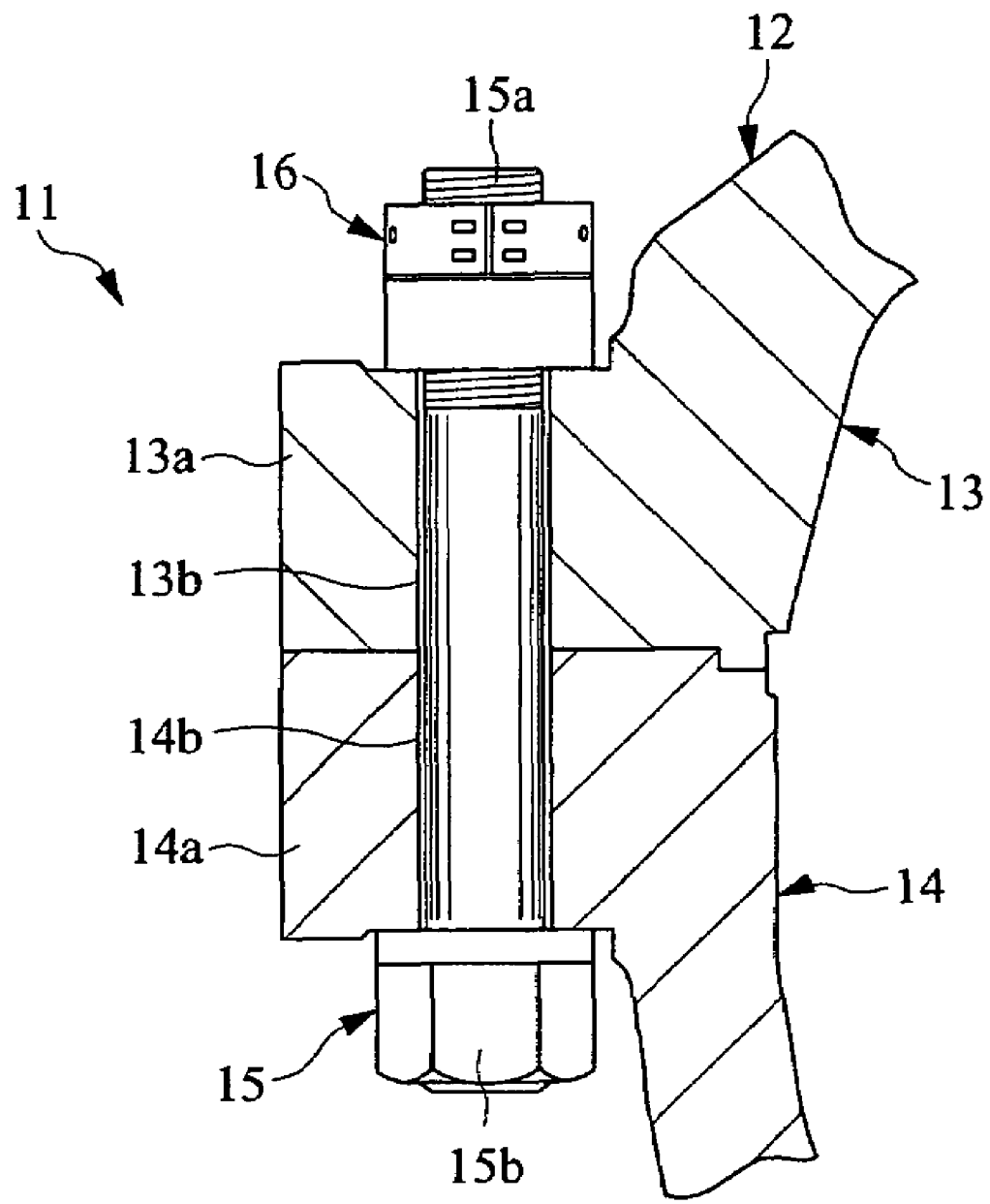
FIG. 1 is a cross-sectional view showing a part of a gas turbine using a fluid pressure nut according to one embodiment of the present invention.

A gas turbine 11 shown in FIG. 1 has been conventionally known as used in a power plant of an electric power station and the like, and an interior of the turbine case 12 thereof is stored with an unshown turbine shaft which converts thermal energy of the gas assumed to be under high temperature and high pressure into mechanical energy.

The turbine case 12 as a fastened member is divisibly formed by an upper case 13 and an under case 14, and a bolt 15 is inserted into insertion holes 13b and 14b formed in flanges 13a and 14a of the respective cases 13 and 14. This bolt 15 is inserted from a side of one flange 14a, and protrudes from a side of the other flange 13a, and the screw portion 15a thereof is screw-fastened to a fluid pressure nut 16 as a fluid pressure device. By doing so, between a head portion 15b of the bolt 15 and the fluid pressure nut 16, there is assembled a turbine case 12 by nipping the flanges 13a and 14a. At this time, the fluid pressure nut 16 is screw-fastened in a state of applying a tensile force to the bolt 15 in advance, and prevents a slack of the fastening in a state in which an axial tension is generated in the bolt 15 after the fastening.

Figure 2:
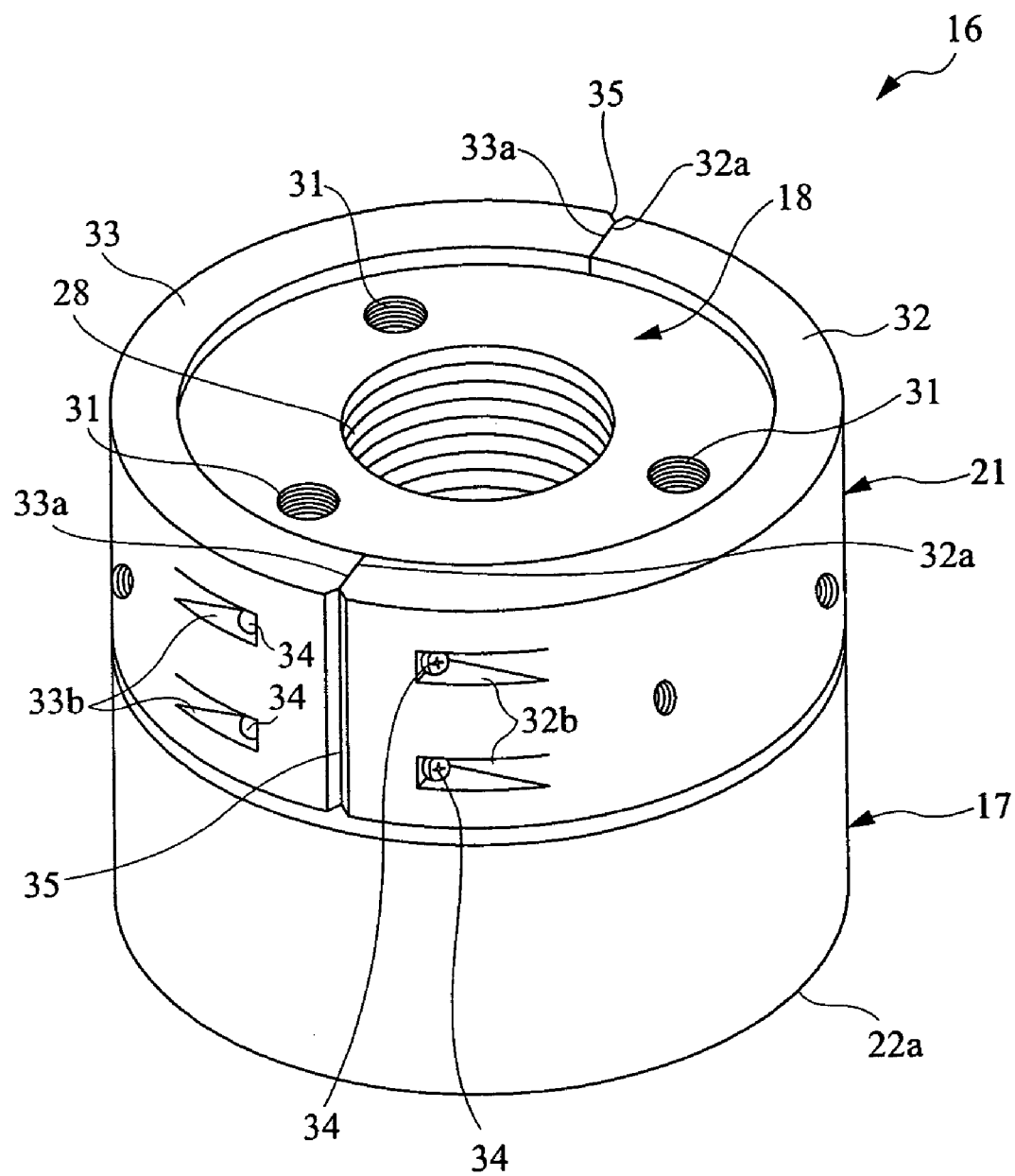
FIG. 2 is a perspective view showing the detail of the fluid pressure nut shown in FIG. 1.

As shown in FIG. 2, the fluid pressure nut 16 comprises a first load supporting member 17, a second load supporting member 18, and a lock ring 21, and its contour is formed in a substantially cylindrical shape.

Figure 3:
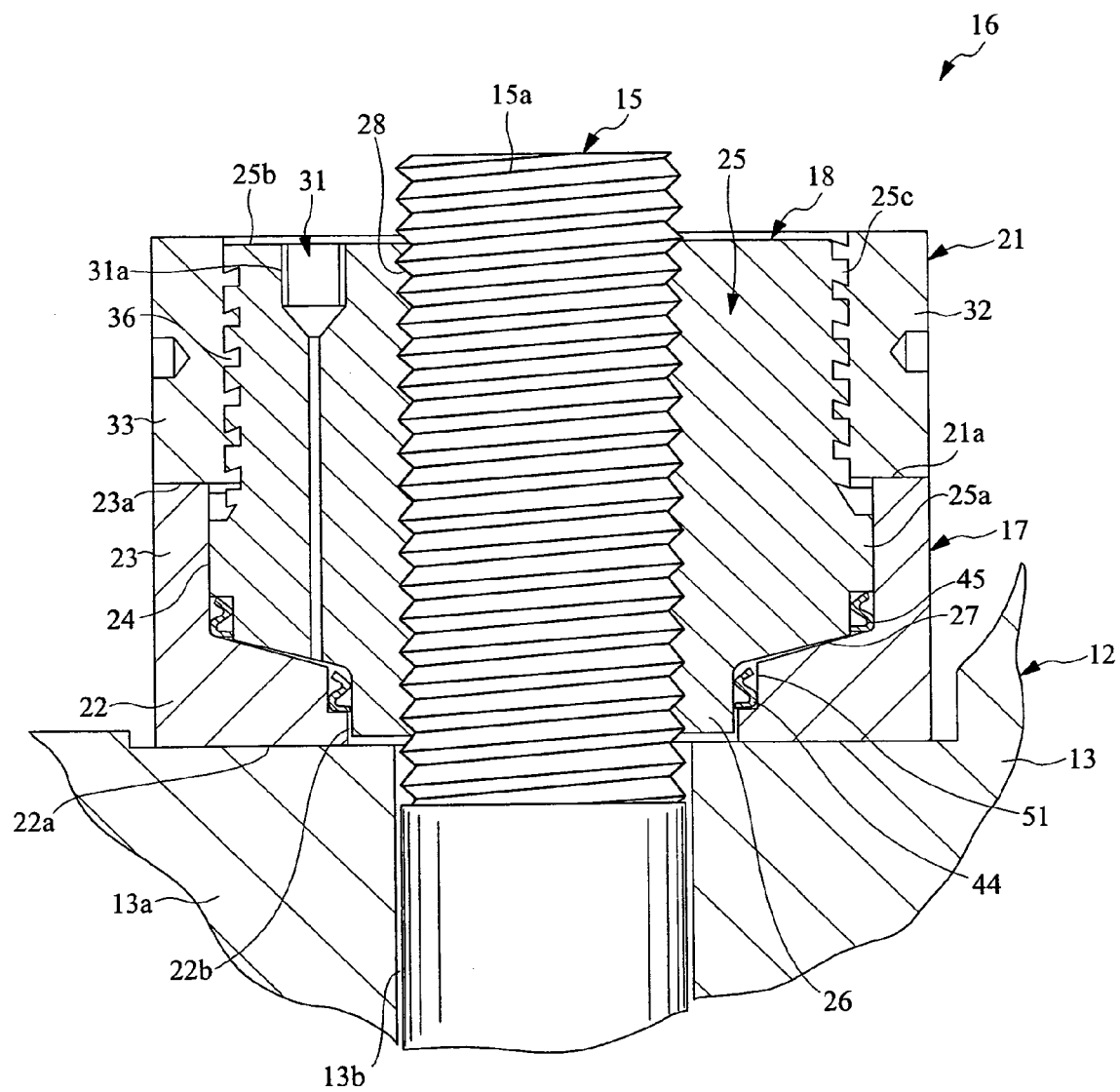
FIG. 3 is a cross-sectional view showing a usage state (before fastening) of the fluid pressure nut shown in FIG. 1.
Figure 4:
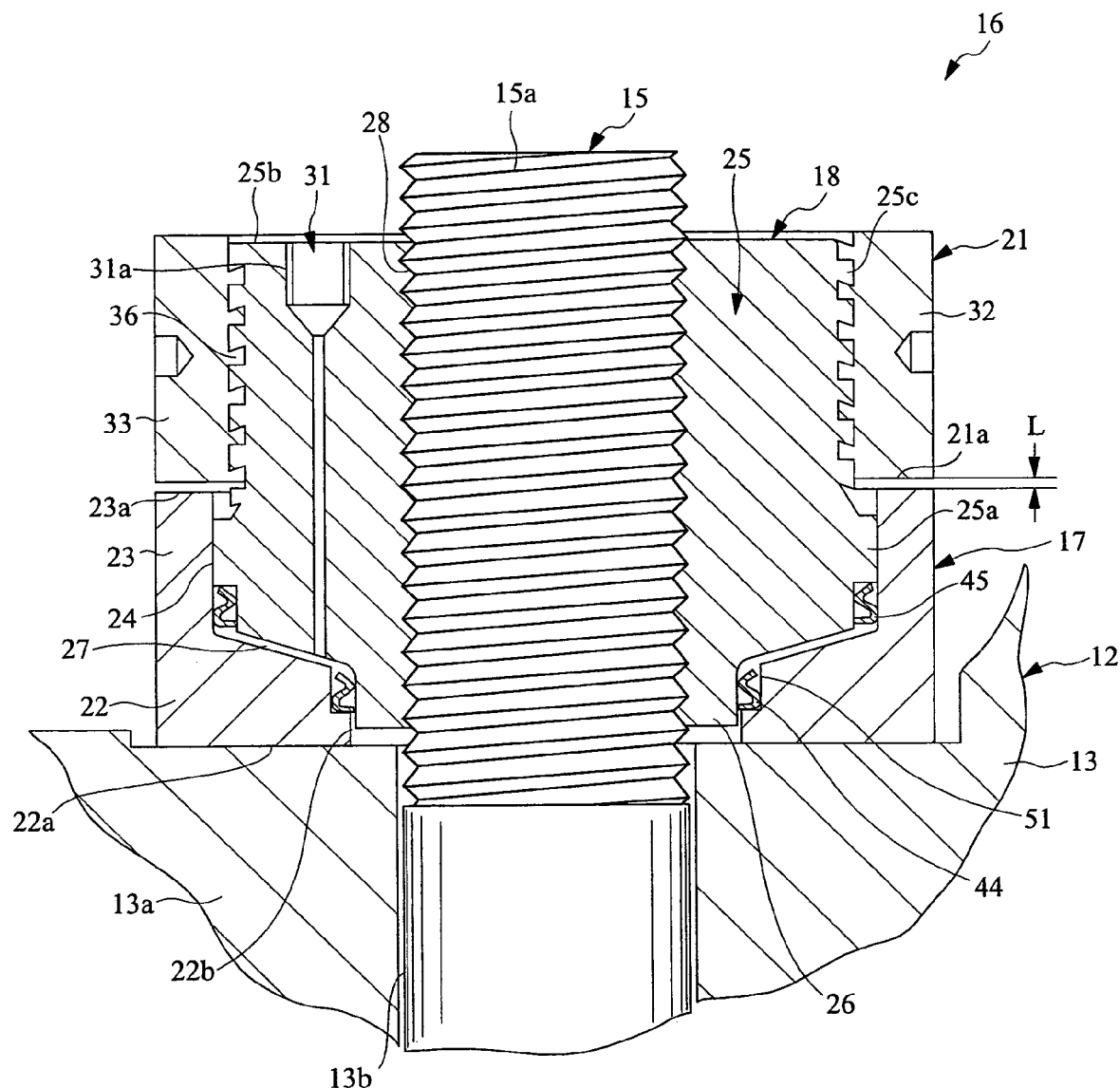
FIG. 4 is a cross-sectional view showing a usage state (after fastening) of the fluid pressure nut shown in FIG. 1.

As shown in FIGS. 3 and 4, the first load supporting member 17 is formed in an annular shape comprising a bottom wall portion 22 formed in a disk shape and a side wall portion 23 formed in a cylindrical shape. The bottom wall 22 and the side wall portion 23 are integrally formed and their materials are steel materials. The first load supporting member 17 is disposed in a flange 13a in a fastening surface 22a formed in the bottom wall portion 22. An inner side of the side wall portion 23 serves as a cylinder 24, and a screw portion 15a of the bolt 15 protruding from the flange 13a protrudes to the cylinder 24 from a pass-through hole 22b provided in an axial center of the bottom wall portion 22.

Meanwhile, the second load supporting member 18 is formed in a substantially annular shape having a large-diameter cylindrical portion 25 and a small-diameter cylindrical portion 26. The large-diameter cylindrical portion 25 and the small-diameter cylindrical portion 26 are mutually coaxial so as to be integrally formed, and their materials are steel materials. The large-diameter cylindrical portion 25 is provided with a piston portion 25a. The second load supporting member 18 has this piston portion 25a axially slidably engaged with the cylinder 24, and is axially movably incorporated into the first load supporting member 17 in a state in which an outer circumferential surface of the small-diameter cylindrical portion 26 is slidably engaged with the inner circumferential surface of the pass-through hole 22b, and between the first load supporting member 17 and the second load supporting member 18, there is an annular pressure chamber 27 partitioned and formed by the cylinder 24 and the piston portion 25a. This pressure chamber 27 increases its volume when the second load supporting member 18 moves in a direction of separating from the first load supporting member 17, and decreases its volume when the second load supporting member 18 moves in a direction of approaching the first load supporting member 17.

The large-diameter cylindrical portion 25 and the small-diameter cylindrical portion 26 are provided with a screw hole 28 so as to penetrate the axle center, and the second load supporting member 18 is screw-fastened on the bolt 15 in this screw hole 28. Consequently, when the second load supporting member 18 moves in a direction of separating from the first load supporting member 17, a tensile force from the second load supporting member 18 is applied to the bolt 15.

The second load supporting member 18 is provided with three supply/exhaust ports 31 for supplying working oil as a working medium, that is, oil pressure into the interior of the pressure chamber 27. These supply/exhaust ports 31 penetrate from the end surface 25b on a side exposed outside the large-diameter cylindrical portion 25 toward the interior of the pressure chamber 27, and are connected to an unshown oil pressure pump in a connection screw portion 31a opened at the end surface 25b. By this oil pressure pump, the oil pressure can be supplied to the interior of the pressure chamber 27 through the supply/exhaust ports 31. At this time, any of the supply/exhaust ports 31 is opened for air release in the initial stage of the oil pressure supply, and after the interior of the pressure chamber 27 is filled up with the working oil, it is blocked by an unshown plug etc. Note that, in this embodiment, although three supply/exhaust ports 31 are provided to the second load supporting member 18, they are not limited to this and may be provided to, for example, the first load supporting member 17 if communicating with the outside and the pressure chamber 27, and also the number thereof may be arbitrarily set. Further, separately from the supply/exhaust port 31, a port for air release may be formed in the first load supporting member 17.

As shown in FIG. 2, the lock ring 21 is comprised of two pieces of half-split rings 32 and 33 formed in semi-annular shapes by steel products. These half-split rings 32 and 33 are put into a state in which both circumferential-directional end portions 32a and 33a contact with each other, and are fastened by the screw members 34, so that the lock ring 21 is formed in a semi-annular shape. In other words, this lock ring 21 is radially divisibly formed. The screw members 34 are screw-fastened on notch portions 32b and 33b formed on an outer circumferential surface of each of the half-split rings 32 and 33, and are small to the extent of not enlarging the external size of the lock ring 21. Further, V-grooves 35 are formed at the end portions 32a and 33a in fastened portions of the half-split rings 32 and 33, and after the screw members 34 are taken out, the lock ring 21 can be easily split by knocking a chisel etc. into these V-grooves.

A female screw portion 36 is formed on an inner circumferential surface of this lock ring 21, and the lock ring 21 is screw-fastened on the male screw portion 25c formed in an outer circumferential surface of the large-diameter cylindrical portion 25 in this female screw portion 36. Further, a load supporting surface 21a is formed in one end surface (end surface on a lower side in FIG. 3) vertical to an axial direction of this lock ring 21, and this load supporting surface 21a is opposed to an opening-side end surface 23a of the side wall portion 23. By rotating the lock ring 21 circumferentially, the lock ring 21 can be axially moved to a position where the load supporting surface 21a contacts with the end surface 23a.

Figure 5A:
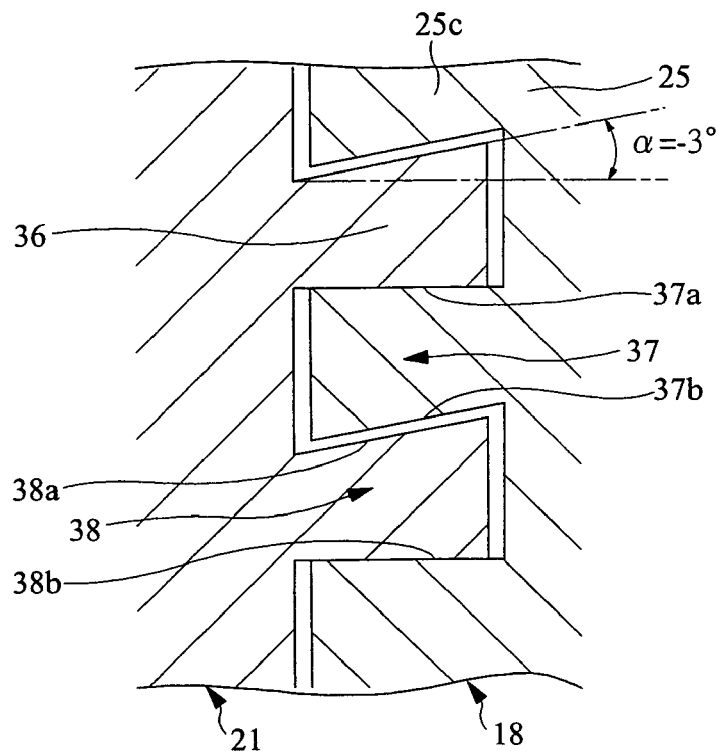
FIG. 5A is an enlarged cross-sectional view showing a female screw portion of a lock ring shown in FIG. 3.
Figure 5B:
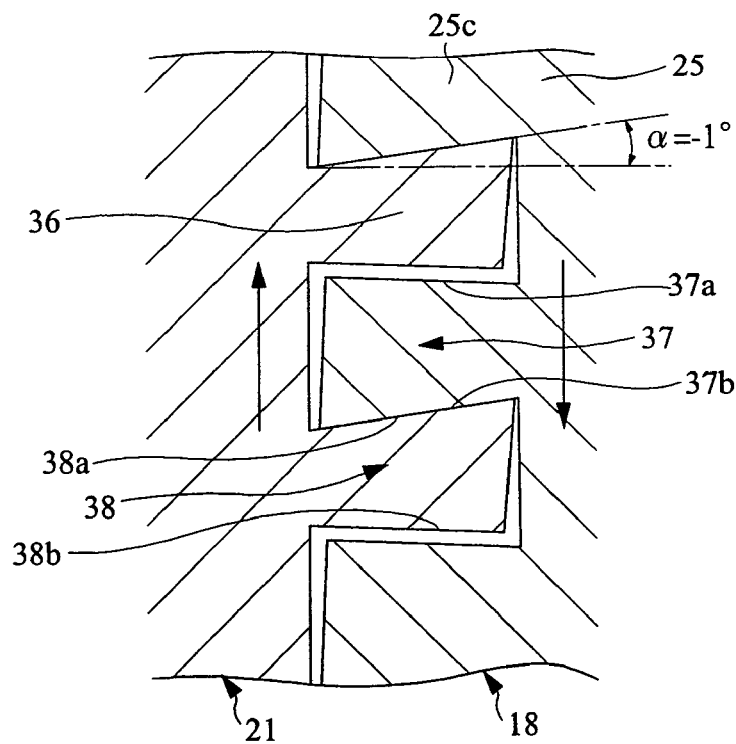
FIG. 5B is a cross-sectional view showing a state in which a load is applied to the female screw portion shown in FIG. 5A.
Figure 6A:
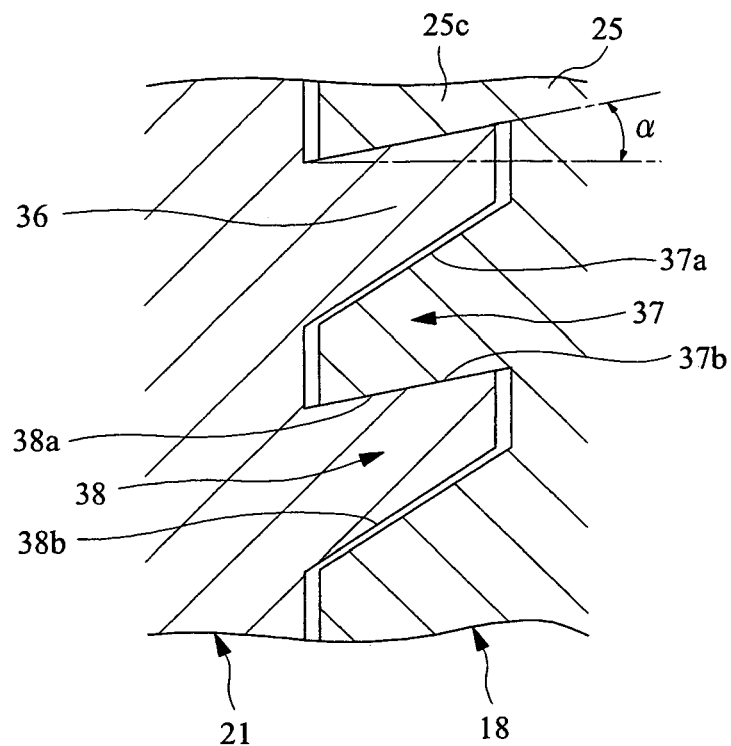
FIGS. 6A and 6B are cross-sectional views showing a modified example of the female screw portion shown in FIG. 5.
Figure 6B:
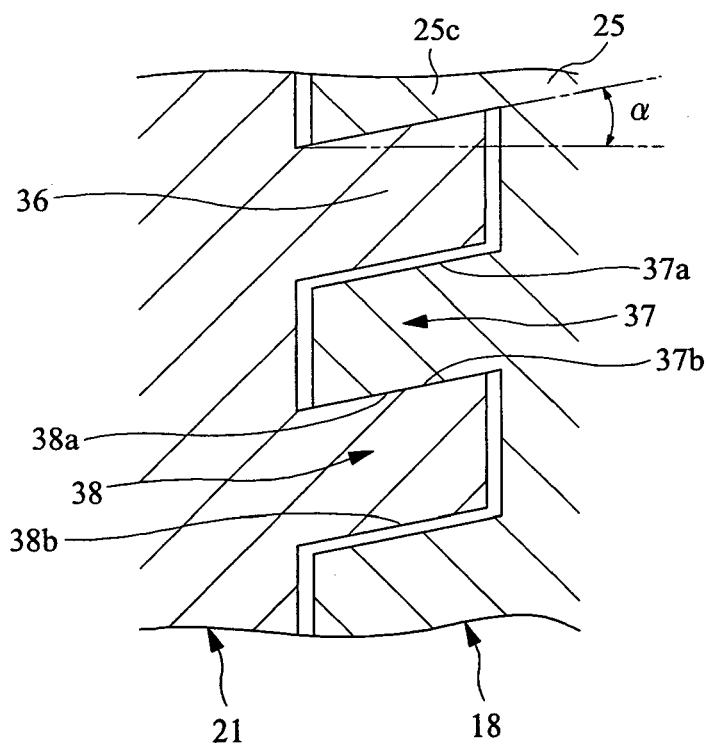

FIG. 5A is a enlarged cross-sectional view showing a female screw portion of the lock ring shown in FIG. 3, and FIG. 5B is a cross-sectional view showing a state in which a load is applied to the female screw portion shown in FIG. 5A. Further, FIGS. 6A and 6B are cross-sectional views showing a modified example of the female screw portion shown in FIG. 5. Note that, in FIGS. 6A and 6B, members corresponding to the aforementioned members are denoted by the same reference numerals.

As shown in FIG. 5A, a male screw portion 25c formed in a large-diameter cylindrical portion 25 is such that its thread 37 is basically formed like a square thread and concurrently, in a pair of flanks 37a and 37b, the flank 37b on a load supporting side, i.e., on a side of being directed to the same direction as that of a load supporting surface 21a is formed so as to incline in a direction of approaching the load supporting surface 21a from a root portion toward a tip portion. In other words, angle of inclination of this flank 37b, that is, a flank angle $\alpha$ is assumed to be minus, for example, in a range of approximately 0° to −10°. In the case of this embodiment, it is set approximately at −3°. In conformity with this, a female screw portion 36 to be formed in the lock ring 21 is such that its thread 38 is basically formed like a square thread and concurrently, in a pair of flanks 38a and 38b of the thread 38, the flank 38a directed to a side opposite to the load supporting side, that is, the load supporting surface 21a is formed so as to incline in a direction of separating from the load supporting surface 21a, from the root portion toward the top end portion. In other words, angle of inclination of this flank 38a, that is, a flank angle becomes the flank angle a which is set at a minus value similarly to the flank 37b of the thread 37. These flank angles α, as shown in FIG. 5B, are set to be always in the minus range even when a load from the second load supporting member 18 is applied to the lock ring 21 and the respective threads 37 and 38 are axially bent. In the case of this embodiment, the flank angle α when the load is applied is set so as to be about −1°. In the present embodiment, as shown in FIG. 5, although the female screw portion 36 is based on a square thread, it is not limited to this. For example, as shown in FIG. 6A, by basing the female screw portion 36 and the male screw portion 25c on triangular threads, the flank angle α on the load supporting side may be set to a minus value. Or, as shown in FIG. 6B, the male screw portion 25c may have the rhombic-sectional thread 37 in which the flank 37a set at the minus flank angle α on the load supporting side and the flank 37b on a non-load supporting side are set in parallel, and the female screw portion 36 may have a rhombic-sectional thread 38 in which the flank 38a set at the minus flank angle a on the load supporting side and the flank 38b on a non-load supporting side are set in parallel.

Figure 7A:
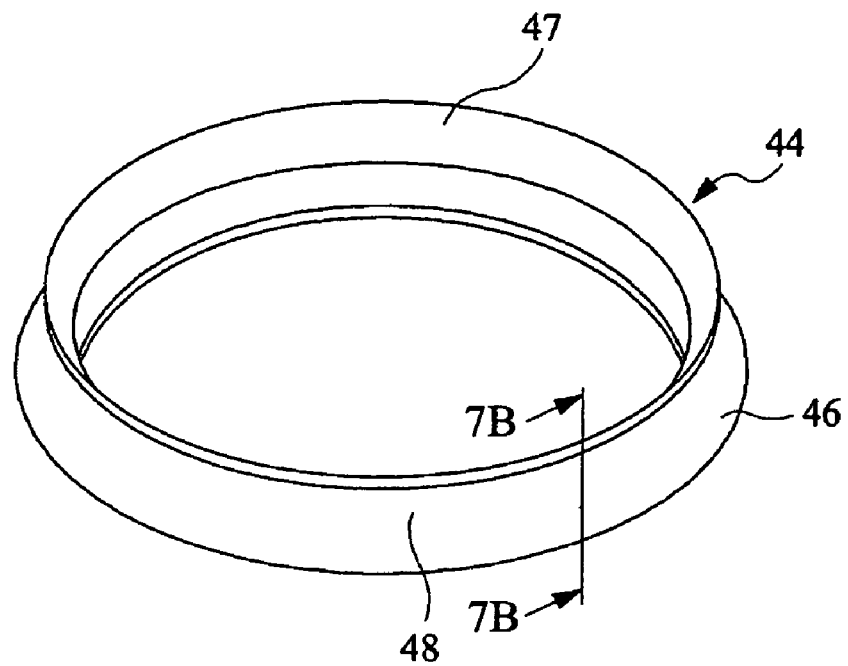
FIG. 7A is a perspective view showing the detail of a seal ring shown in FIG. 3
Figure 7B:
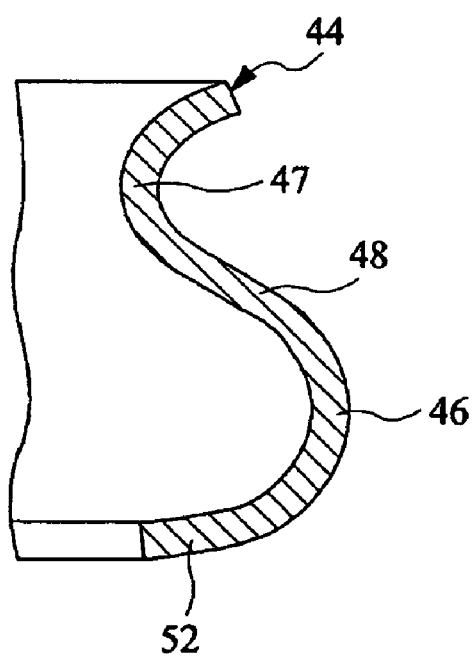
FIG. 7B is a cross-sectional view along line 7B-7B of FIG. 7A.
Figure 8:
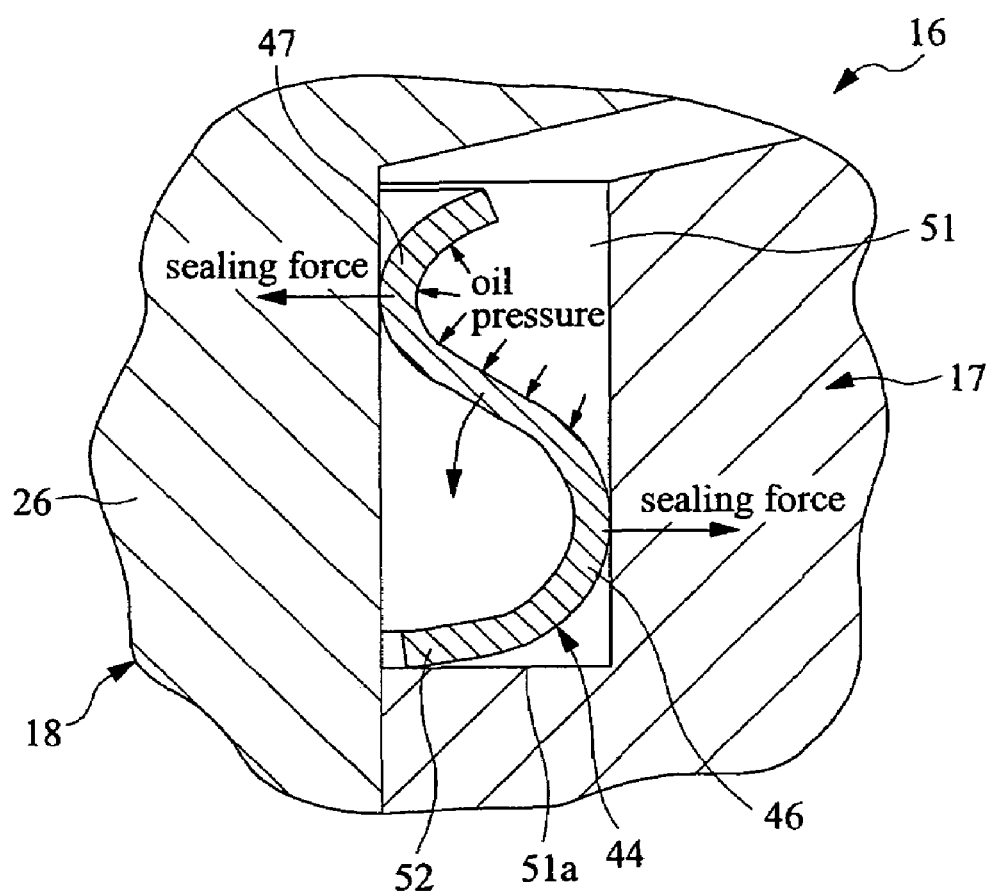
FIG. 8 is an enlarged cross-sectional view showing a mounting state of the seal ring.

FIG. 7A is a perspective view showing the detail of the seal ring shown in FIG. 3, and FIG. 7B is a cross-sectional view taken along line 7B-7B in FIG. 7A. Further, FIG. 8 is an enlarged cross-sectional view showing a mounting state of the seal ring, and FIGS. 9A to 9D are cross-sectional views showing modified examples of the seal ring shown in FIG. 7. Note that, in FIGS. 9A to 9D, members corresponding to the aforementioned members are denoted by the same reference numerals.

This fluid pressure nut 16 is provided with two seal rings 44 and 45 for preventing leakage of the oil pressure supplied to the pressure chamber 27.

The seal ring 44 is provided in a sliding portion of one end portion of the pressure chamber 27, that is, a pass-through hole 22b and the small-diameter cylindrical portion 26, thereby preventing the leakage of the oil pressure from the sliding portion of the pass-through hole 22b and the small-diameter cylindrical portion 26. Further, a seal ring 45 is provided in a sliding portion of the other end portion of the pressure chamber 27, that is, the cylinder 24 and a piston portion 25a, thereby preventing the leakage of the oil pressure from the sliding portion of the cylinder 24 and the piston portion 25a.

Since these seal rings 44 and 45 basically have the same structure, the case of the seal ring 44 will be described below.

As shown in FIG. 7A, the seal ring 44 is formed by a steel material into an annular shape having a first curve portion 46, a second curve portion 47, and a pressure receiving portion 48, wherein as shown in FIG. 7B, its section is in a substantially "S" shape. The first curve portion 46 and the second curve portion 47 are axially shifted and disposed, and the pressure receiving portion 48 continuing into these curve portions 46 and 47 is taper-shaped so that its diameter is reduced from the first curve portion 46 toward the second curve portion 47.

As shown in FIG. 8, this seal ring 44 is attached to an circular groove portion 51 formed in the first load supporting member 17, thereby becoming in a state in which the first curve portion 46 is brought into contact with the first load supporting member 17, i.e., an inner circumferential surface of the circular groove portion 51 and the second curve portion 47 is brought into contact with the second load supporting member 18, i.e., an outer circumferential surface of the small-diameter cylindrical portion 26. Further, in the seal ring 44, a positioning stopper portion 52 is formed in an end portion on one axial-directional side, i.e., on a side of the first curve portion 46, whereby since this stopper portion 52 abuts on a stopper surface 51a formed in the circular groove portion 51 parallel to a fastening surface 22a, the axially positioning of the seal ring 44 can be carried out.

At this time, in this seal ring 44, the curve portion axially further from the pressure chamber 27 in the first curve portion 46 and the second curve portion 47, I.e., the first curve portion 46 is formed so that its outer diameter is larger than an inner diameter of the circular groove portion 51, and is attached so that it is strongly brought into contact with the first load supporting member 17 in a state of being elastically deformed in a direction of reducing its diameter by slightly cooling fit. Further, the inner diameter of the second curve portion 47 is formed to be smaller than the outer diameter of the small-diameter cylindrical portion 26, and the second curve portion 47 is attached in a state in which its diameter is elastically deformed in a direction of being enlarged. In other words, since the first curve portion 46 and the second curve portion 47 are elastically deformed in a reverse direction, this seal ring 44 is attached to the circular ring portion 51 in a state of being elastically deformed in a taper shape as a whole. Consequently, the first curve portion 46 becomes in a state in which a radial sealing force is generated by its elastic force toward the first load supporting member 17. The second curve portion 47 becomes in a state in which a radial sealing force is generated by its elastic force toward the second load supporting member 18. Note that a shape of the seal ring 44 is not limited to the shape shown in FIG. 7 and, as shown in FIGS. 9A and 9B, for example, the circular-sectional stopper portion 53 may be formed to ensure rigidity of the stopper portion 52. In this case, the first curve portion 46 is integrally formed with the stopper portion 53 on the outer circumferential surface of this stopper portion 53. Further, in this case, the stopper portion 53 is not limited to a circular-sectional shape and if having a shape capable of ensuring predetermined rigidity, for example, as shown in FIG. 9C, it may be formed in a rice-bag-sectional shape. Further, the seal ring 44 may be integrally formed with a cylindrical member 54 at one end of the cylindrical member 54 cylindrically formed. In this case, the stopper portion 52 is provided at tan end portion of the cylindrical member 54.

Next, an operation of such a fluid pressure nut 1 will be now described.

First, as shown in FIG. 3, the first load supporting member 17 is disposed in the flange 13a, and the screw portion 15a of the bolt 15 inserted from the pass-through hole 22b is screw-fastened on the screw hole 28 of the second load supporting member 18. At this time, the oil pressure is not supplied to the pressure chamber 27, and the second load supporting member 18 is close to the first load supporting member 17.

Next, an unshown oil pressure pump is connected to any of the supply/exhaust ports 31, and the working oil is supplied to the interior of the pressure chamber 27 by a predetermined pressure. In this case, the oil pressure supplied to the pressure chamber 27 is set to be a super high pressure of approximately 250 Mpa. Due to this oil pressure, the second load supporting member 18 moves in a direction of increasing the volume of the pressure chamber 27, i.e., in a direction of separating from the first load supporting member 17. Consequently, as shown in FIG. 4, the bolt 15 screw-fastened on the second load supporting member 18 becomes in a state in which the screw portion 15a moves together with the second load supporting member 18 and a tensile force is axially applied, whereby the bolt 15 axially extends by the tensile force. At this time, by movement of the second load supporting member 18, there is created a gap "L" between the load supporting surface 21a of the locking ring 21 and the end surface 23a of the first load supporting member 17. Thus, energy of the working oil supplied to the pressure chamber 27 is converted into mechanical energy obtained by the movement of the second load supporting member that applies the tensile force to the bolt 15.

Next, the lock ring 21 is moved to a position where the load supporting surface 21a of the lock ring 21 and the end surface 23a of the first load supporting member 17 abut on each other, and the supply of the oil pressure by an oil pressure pump is stopped. Then, the pressure of the pressure chamber 27 is lowered and although a load in a direction of approaching the first load supporting member 17 is applied to the second load supporting member 18 due to the elastic force of the bolt 15, the second load supporting member 18 becomes in a state in which the load applied from the bolt 15 is supported by the lock ring 21 and the movement toward a side of the first load supporting member 17 is restricted. Therefore, the load applied to the second load supporting member 18 from the bolt 15 is applied to the first load supporting member 17 through the lock ring 21. Consequently, even after the oil pressure is released, the bolt 15 remains in a state in which the tensile force is applied, that is, the fastening of the turbine case 12 is carried out in a state in which the bolt 15 generates an axial tension. Due to this axial tension of the bolt 15, a fastening surface 22a of the fluid pressure nut 16 is strongly brought into contact with the flange 13a, whereby the slack of the fastening is prevented.

Here, when the oil pressure is supplied to the pressure chamber 27 in order to apply a tensile force to the bolt 15, the oil pressure is also applied to the seal rings 44 and 45. However, the seal rings 44 and 45 are attached to the circular groove portion 51 in a state in which the respective curve portions 46 and 47 are radially deformed elastically, and the first curve portion 46 and the second curve portion 47 are axially shifted and disposed. Consequently, in a state of being attached to the circular groove portion 51, the seal rings 44 and 45 are elastically deformed in a taper shape as a whole in addition to the elastic deformation of each of the curve portions 46 and 47, so that these radial elastic deformation amounts of seal rings 44 and 45 become large and, due to this elastic force, a strong radial sealing force can be obtained. Further, even when the width size of the sliding portion of the first load supporting member 17 and the second load supporting member 18 is, for example, deformed by applying heat, the radial elastic deformation amounts of these seal rings 44 and 45 are large, so that the strong radial sealing force can be obtained due to the elastic force.

Thus, in this fluid pressure nut 16, since the sealing forces of the seal rings 44 and 45 provided in the end portion of the pressure chamber 27 can be improved, an upper limit of the oil pressure supplied to the fluid pressure nut 16 can be raised. Further, the upper limit of the oil pressure supplied to the pressure chamber 27 is raised, so that even when pressure receiving areas of the cylinder 24 and the piston portion 25a are formed small, a desired tensile force can be applied to the bolt 15 by increasing the oil pressure applied to the pressure chamber 27, whereby it is possible to make the fluid pressure nut 16 compact and light in weight by forming small the pressure chamber 27.

Further, these seal rings 44 and 45 generates a sealing force by making the first curve portion 46 line-contact with the first load supporting member 17 and the second curve portion 47 line-contacting with the second load supporting member 18. In other words, a portion in which the sealing force is generated is curved, so that, for example, even in the case where the first load supporting member 17 and the second load supporting member 18 are axially shifted such as the case where the bolt 15 is inclined, such shifting can be absorbed and thereby the sealing force can be maintained.

Thus, in the fluid pressure nut 16, even when the bolt 15 is inclined, the sealing forces of the seal rings 44 and 45 are never lowered.

Further, in these seal rings 44 and 45, such a force that an inclination is increased in a direction of becoming parallel to the fastening surface 22a is applied to the pressure receiving portion 48, to which the oil pressure is applied, as a supporting point as which the first curve portion 46, in which the axial movement is restricted by the stopper portion 52, is regarded. When a force in a direction of increasing the inclination of the pressure receiving portion 48 is applied, such a load energizes the first curve portion 46 outside and radially and energizes the second curve portion 47 inside and radially. In other words, the pressure applied to the pressure receiving portion 48, i.e., the oil pressure is converted into the radial-directional sealing forces of the respective curve portions 46 and 47. Therefore, the sealing forces of the respective curve portion 46 and 47 are increased.

Thus, in this fluid pressure nut 16, since the pressure applied to the pressure receiving portion 48 is converted into the radial-directional sealing forces of the respective curve portions 46 and 47, the sealing forces of the seal rings 44 and 45 are enhanced and thereby the upper limit of the oil pressure supplied to the fluid pressure nut 16 can be raised.

Now, since this fluid pressure nut 16 is used for assembling the turbine case 16, the fluid pressure nut 16 after being fastened is placed under a high temperature environment. However, in this fluid pressure nut 16, the seal ring 44 and 45 directly line-contact with the first load supporting member 17 or second load supporting member 18 in the respective curve portions 46 and 47, such that even if the end portions of these seal rings 44 and 45 are slightly molten or deformed due to high heat, it does not affect the sealing forces. In other words, even if this fluid pressure nut 16 is used under the high temperature environment, the sealing forces by the seal rings 44 and 45 are maintained and durability of the fluid pressure nut 16 under the high temperature environment is improved. Consequently, for example, even when the fastening by the fluid pressure nut 16 is released to perform maintenance and inspection etc. of the gas turbine 11, the oil pressure is not leaked in spite of supplying the rated oil pressure to the pressure chamber 27 and the fluid pressure nut 16 can be easily taken out.

Thus, in this fluid pressure nut 16, the seal rings 44 and 45 line-contact the first load supporting member 17 or second load supporting member 18 in the respective curve portions 46 and 47, so that even in the case of being used under the high temperature environment, the sealing forces can be maintained and the durability of the fluid pressure nut 16 under the high temperature environment can be improved.

Meanwhile, in this fluid pressure nut 16, the lock ring 21 is divisibly formed, so that even when the oil pressure is unable to be raised to a specified value for some reasons in taking out the fluid pressure nut 16, the load applied to the second load supporting member 18 can be released by disassembling the lock ring. Further, at this time, since V-shaped groove 35 is formed on each fastening surface of the half-split rings 32 and 33, the lock ring 21 can be easily disassembled by knocking a chisel etc. into the V-shaped groove 35.

Thus, in the fluid pressure nut 16, the lock ring 21 is divisibly formed, so that even when the oil pressure is unable to be raised to the specified value for some reasons, this fluid pressure nut 16 can be easily taken out by disassembling the lock ring 21.

Further, when the lock ring 21 supports the axial tension of the bolt 15 transmitted through the second load supporting member 18, as shown in FIG. 5B, the thread 38 of the female screw portion 36 formed in its inner circumferential surface is elastically deformed. At this time, in the female screw portion 36 of the lock ring 21 and the male screw portion 25c of the second load supporting member 18, the flanks 37b and 38a on load supporting sides are formed to be minus, so that the load supplied to the lock ring 21 from the second load supporting member 18 is disassembled into a load for axially pressing the lock ring 21 toward the first load supporting member 17 and a load exerted in a direction of drawing the lock ring 21 radially and inside. Consequently, the lock ring 21 in a state of supporting the load from the bolt 15 is drawn to the second load supporting member 18. In other words, even when this lock ring 21 is formed into a divisible structure in which the half-split rings 32 and 33 are assembled by using the screw members 34, these half-split rings 32 and 33 are strongly fastened by a reactive force of the female screw portion 36. Therefore, axial-directional thick dimensions of these half-split rings 32 and 33 are made small, and the screw members 34 for assembling these half-split rings 32 and 33 are made small to an extent of not affecting the external size of the lock ring 21, thereby making it possible to make the lock ring 21, i.e., the fluid pressure nut 16 compact and light in weight.

Thus, in this fluid pressure nut 16, the flank 37b on the load supporting side of the male screw portion 25c of the second load supporting member 18 and the flank 38a on the load supporting side of the female screw portion 36 of the lock ring 21 are set to be minus, so that even when the lock ring 21 has a split structure, the fluid pressure nut 16 can be made compact and light in weight.

Figure 10:
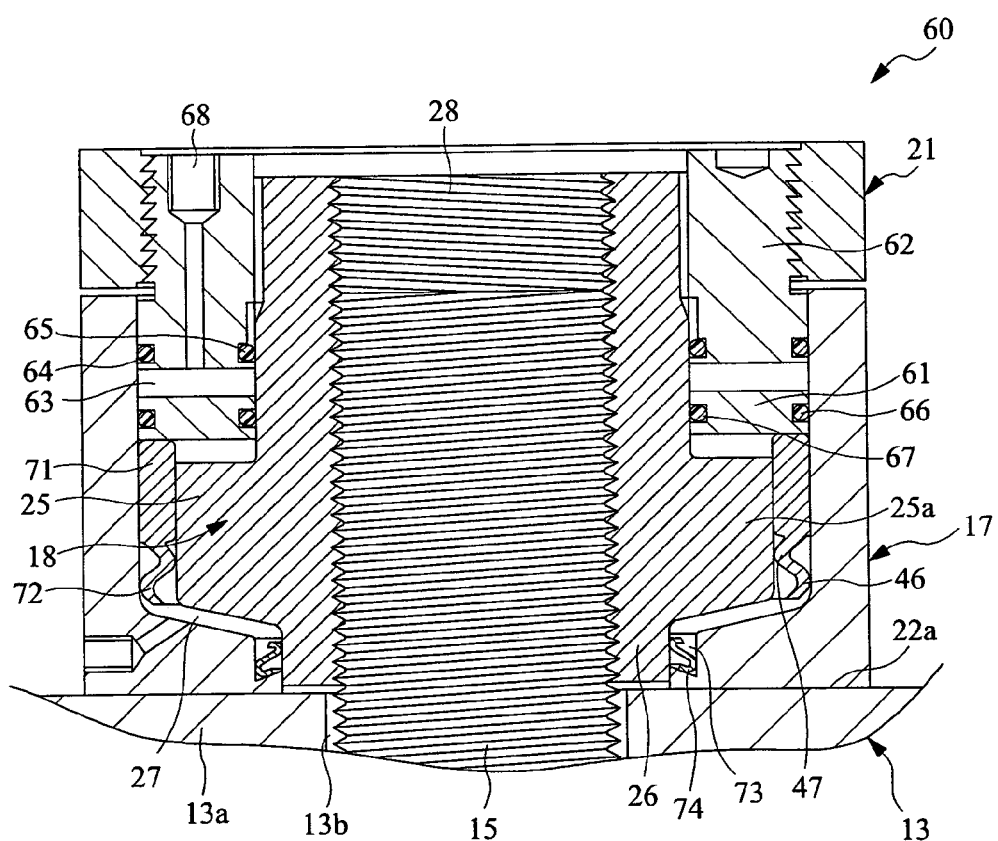
FIG. 10 is a cross-sectional view showing a modified example of the fluid pressure nut shown in FIG. 2.
Figure 11:
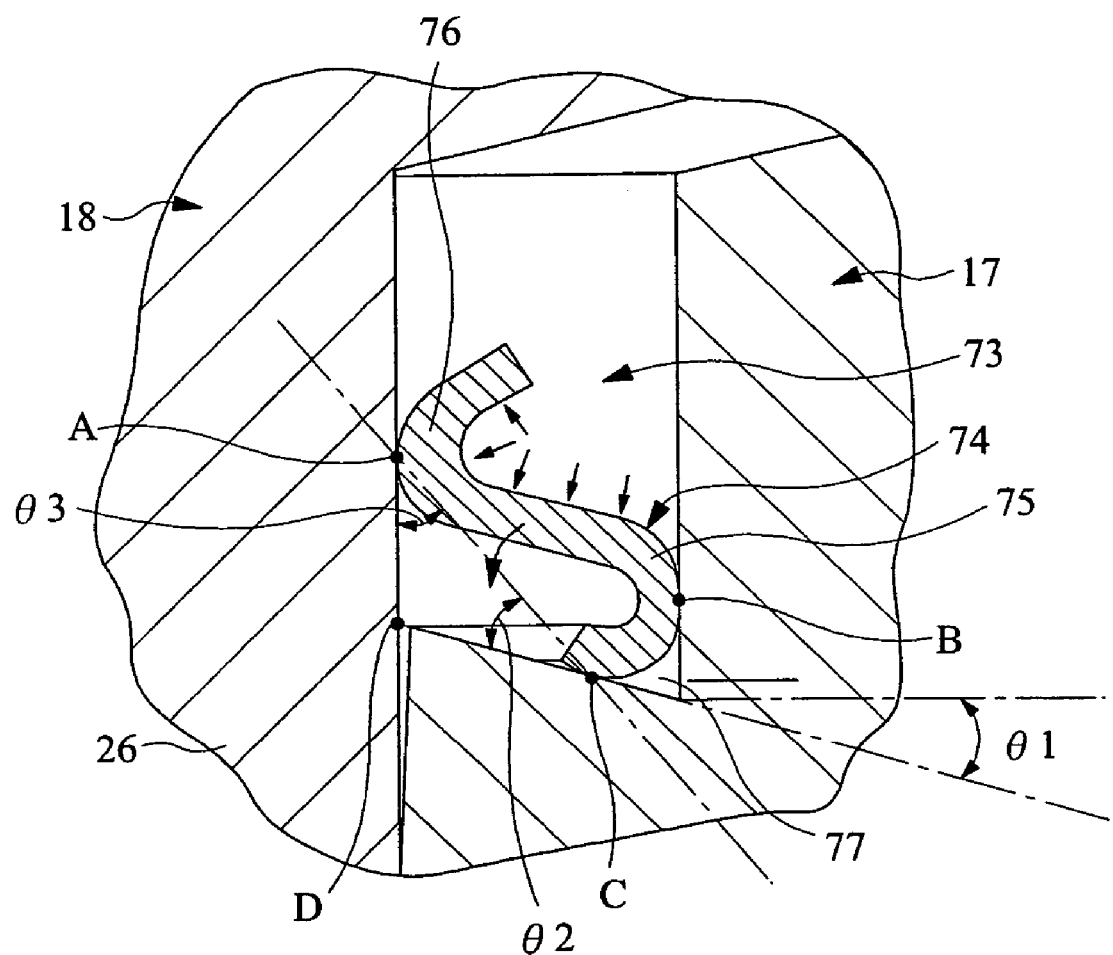
FIG. 11 is an enlarged cross-sectional view showing a mounting state of the seal ring shown in FIG. 10.

FIG. 10 is a cross-sectional view showing a modified example of the fluid pressure nut shown in FIG. 2, and FIG. 11 is an enlarged cross-sectional view showing an attaching state of a seal ring shown in FIG. 10. Note that members corresponding to the aforementioned members in FIGS. 10 and 11 are denoted by the same reference numeral.

A fluid pressure nut 60 shown in FIG. 10 has a circular load input piston 61 axially slidable with respect to the inner circumferential surface of the first load supporting member 17 and the outer circumferential surface of the second load supporting member 18 on a side far away from the fastening surface 22a of the piston portion 25a. Further, the second load supporting member 18 is provided with a reactive force receiving portion 62 which opposes the load input piston 61 and slidably contacts with the inner circumferential surface of the first load supporting member 17. By this reactive force receiving portion 62 and the load input piston 61, a load input pressure chamber 63 partitioned and formed between the first load supporting member 17 and the second load supporting member 18. Note that the reference numerals "64" to "67" denote seal members for preventing the leakage of the oil pressure from the load input pressure chamber and, as these seal members 64 to 67, O-rings etc. conventionally known are used.

The reactive force receiving portion 62 is provided with supply/exhaust ports 68 to which working oil serving as a load input working medium is supported from an unshown oil pressure pump, so that the working oil with a predetermined pressure can be supplied to the interior of the load input pressure chamber 63 through these supply/exhaust ports 68.

By supplying the working oil, i.e., the oil pressure to the load input pressure chamber 63, a load directed to a side of the fastening surface 22a is applied to the load input piston 61.

A load transmission piston 71 cylindrically formed is fixed between the load input piston 61 and the pressure chamber 27, and this load transmission piston 71 is such that its outer circumferential surface is slid with the inner circumferential surface of the first load supporting member 17 and its inner circumferential surface slid with the outer circumferential surface of the piston portion 25a, whereby axial-directional movement becomes free. Further, an axial-directional one end portion of the load transmission piston 71 contacts with the load input piston 61, and the other end thereof is integrally formed with a metallic seal ring 72 that is disposed at one end portion of the pressure chamber 27. As this seal ring 72, similarly to the seal ring 44 shown in FIG. 7, a structure of having a first curve portion 46 contacting the inner circumferential surface of the first load supporting member 17 and the second curve portion 47 contacting the outer circumferential surface of the piston portion 25a is used. Note that although the load transmission piston 71 and the seal ring 72 are integrally formed in the Figures, those may be formed individually.

Meanwhile, the working oil as the working medium is sealed in the pressure chamber 27 and, by increasing the pressure of this working oil, the volume of the pressure chamber 27 is increased, whereby the second load supporting member 18 can be moved in a direction of separating from the first load supporting member 17.

In the fluid pressure nut 60 thus structured, when the oil pressure is supplied to the load input pressure chamber 63 and the load is applied to the load input piston 61, the load is transmitted to the seal ring 72 through the load transmission piston 71. In other words, since the seal ring 72 is pressed to the load input piston 61 through the load transmission piston 71, the pressure in the pressure chamber 27 is increased and the second load supporting member 18 moves in a direction of separating from the first load supporting member 17, whereby the tensile force is applied to the bolt 15.

Further, an area of the end surface transmitting the load to the working oil sealed into the pressure chamber 27 through the seal ring 72 of the load transmission piston 71, i.e., a pressure receiving area "A1" is set to be smaller than a pressure receiving area "A2" of the piston portion 25a, and the load applied to the second load supporting member 18 through the working oil by the load transmission piston 71 has times proportional to a pressure receiving area ratio, i.e., A2/A1 times, and is transmitted. Consequently, even if the oil pressure supplied to the load input pressure chamber 63 is lowered, a desired tensile force can be outputted to the bolt 15.

Thus, in the fluid pressure nut 60, since the pressure of the working oil in the pressure chamber 27 can be made higher than that of the load input working medium supplied to the load input pressure chamber 63, the pressure receiving area "A2" of the first and second load supporting members 17 and 18 that partition and form the pressure chamber 27 can be made small, thereby making it possible to make the fluid pressure nut 60 compact and light in weight.

Meanwhile, when the working oil is supplied to the load input pressure chamber 63 and the load is applied to the load input piston 61, a reactive force thereof is applied to the reactive force receiving portion 62. By this reactive force, the reactive force receiving portion 62, i.e., the second load supporting member 18 is moved in a direction of separating from the first load supporting member 17 so as to apply the tensile force to the bolt 15. In other words, since the load of the load input piston 61 is transmitted through the reactive force receiving portion 62, the tensile force is applied to the bolt 15.

Consequently, in this fluid pressure nut 60, the load applying the tensile force to the bolt 15 is dispersed into a load to be transmitted by the pressurization of the pressure chamber 27 and a load to be applied through the reactive force receiving portion 62, so that a load of the seal ring 72 can be reduced and an operation of the fluid pressure nut 60 can be made more reliable.

Thus, in this fluid pressure nut 60, the load for applying the tensile force to the bolt 15 can be dispersed into the load to be directly applied to the bolt 15 through the second load supporting member 18 and the load by which the pressure in the pressure chamber 27 is increased, so that the load of the seal ring 72 is reduced, thereby making it possible to make the operation of the fluid pressure nut 60 much more reliable.

Incidentally, as shown in FIG. 11, a seal ring 74 is attached to a circular groove portion 73 formed in the other end portion of the pressure chamber 27 of the fluid pressure nut 60. Similarly to the seal ring 44 provided in the fluid pressure nut 16 shown in FIG. 2, the seal ring 74 is formed in an S-section shape, which has a first curve portion 75 contacting with the first load supporting member 17, a second curve portion 76 contacting with the second load supporting member 18, and a positioning stopper portion 77 contacting with a stopper surface 73*a* of the circular groove portion 73.

In this seal ring 74, the curve portion axially further from the stopper portion 77 in the first curve portion 75 and the second curve portion 76, that is, the second curve portion 76 in this case contacts with the second load supporting member 18 at a contact point "A". Further, the first curve portion 75 contacts with the first load supporting member 17 at a contact point "B", and the contact point "B" is axially shifted from the contact point "A". Further, the stopper surface 73*a* is inclined by an angle θ1 in the same direction as that of a straight line "AB" passing through the contact point "A" and the contact point "B" in this section, with respect to the fastening surface 22*a*. The stopper portion 77 contacts with the stopper surface 73*a* at a contact point "C", and restricts the axial-directional movement of the seal ring 74.

In this seal ring 74, an angle θ2 made by the stopper surface with a straight line "AC" passing through the contact point "A" and the contact point "C" is set to be smaller than an angle θ3 with respect to an axial direction of the straight line "AC". In other words, assuming that an intersection point between an extension line of the stopper surface 73*a* in this section and the second load supporting member 18 is taken as "D", a segment CD is set to be longer than a segment AD. In this case, the stopper surface 73*a* is formed so as to incline to the fastening surface 22*a*, so that even when a positional relation between the contact point "A" and the contact point "C" is the same, the angle θ2 can be made small and therefore a relation of "angle θ2<angle θ3" can be easily established.

By setting the relation of each contact point of the seal ring 74 as described above, through the oil pressure supplied to the pressure chamber 27, this seal ring 74 is pressed in a direction of narrowing an axial-directional interval of the first curve portion 75 and the second curve portion 76, whereby the first curve portion 75 and the second curve portion 76 are always pressed to the first load supporting member 17 or second load supporting member 18 and the sealing force thereof is improved.

Further, by any possibility, even when the first curve portion 75 separates from the first load supporting member 17 and the oil pressure is leaked from the contact point "B", the seal ring 74 itself is pressed to the stopper surface 73*a* by the oil pressure, so that the oil pressure can be sealed at the contact point "C" of the stopper portion 77 and the stopper surface 73*a* and, at the same time, the first curve portion 75 is immediately pressed back to the first load supporting member 17 by the oil pressure and can be self-recover the sealing force.

Thus, in this fluid pressure nut 60, the first curve portion 75 is immediately pressed back to the first load supporting member 17 by the oil pressure and can self-recover the sealing force, so that the sealing force of the seal ring 74 is enhanced and, at the same time, the sealing force can be stabilized.

Note that, in this case, for the sake of simplicity, the shape of the seal ring 74 is described by using each of the contact points "A", "B" and "C" and the straight lines "AB" and "AC", etc. in the cross-sectional view shown in FIG. 11, but in actuality the first curve portion 75, the second curve portion 76, and the stopper portion 77 line-contact with, that is, are tangent in contact lines to the first load supporting member 17, the second load supporting member 18, and the stopper surface 73*a* and each of the straight lines "AB" and "AC", etc. becomes a conical surface passing through these contact lines.

Figure 12:
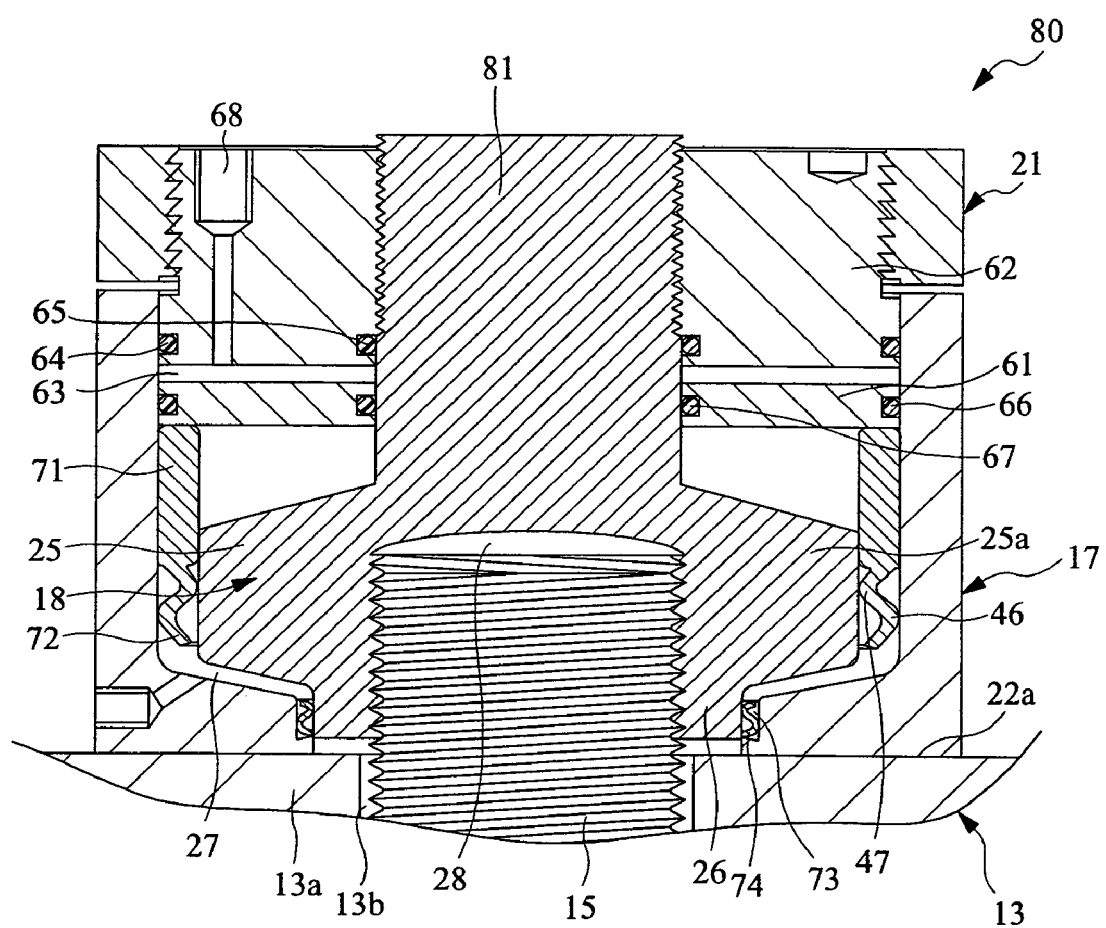
FIG. 12 is a cross-sectional view showing a modified example of the fluid pressure nut shown in FIG. 10.

FIG. 12 is a cross-sectional view showing a modified example of the liquid pressure nut shown if FIG. 10. In FIG. 12, members corresponding to the aforementioned members are denoted by the same reference numeral.

A second load supporting member 18 used in a fluid pressure nut 80 shown in FIG. 12 is provided with a large-diameter cylindrical portion 25 and a small-diameter column portion 81 formed smaller in diameter than the large-diameter cylindrical portion 25, and the inner circumferential surface of a load input piston 61 slidably contacts with an outer circumferential surface of the small-diameter column portion 81. In this case, a screw hole 28 screw-fastened to a bolt 15 is formed only in the large-diameter cylindrical portion 25, and the screw hole 28 does not reach the small-diameter column portion 81. In other words, the screw hole 28 does not penetrate the second load supporting member 18. For this reason, the diameter size of the small-diameter column portion 81 can be formed to an extent of being equal to or less than that of the screw hole 28 and to be sufficiently small with respect to the large-diameter cylindrical portion 25.

Consequently, a pressure receiving area of the load input piston 61 can be made larger than the case of the fluid pressure nut 60 shown in FIG. 10, so that even when the oil pressure supplied to the load input pressure chamber 63 is further lowered, a desired tensile force can be applied to the bolt 15.

Figure 13:
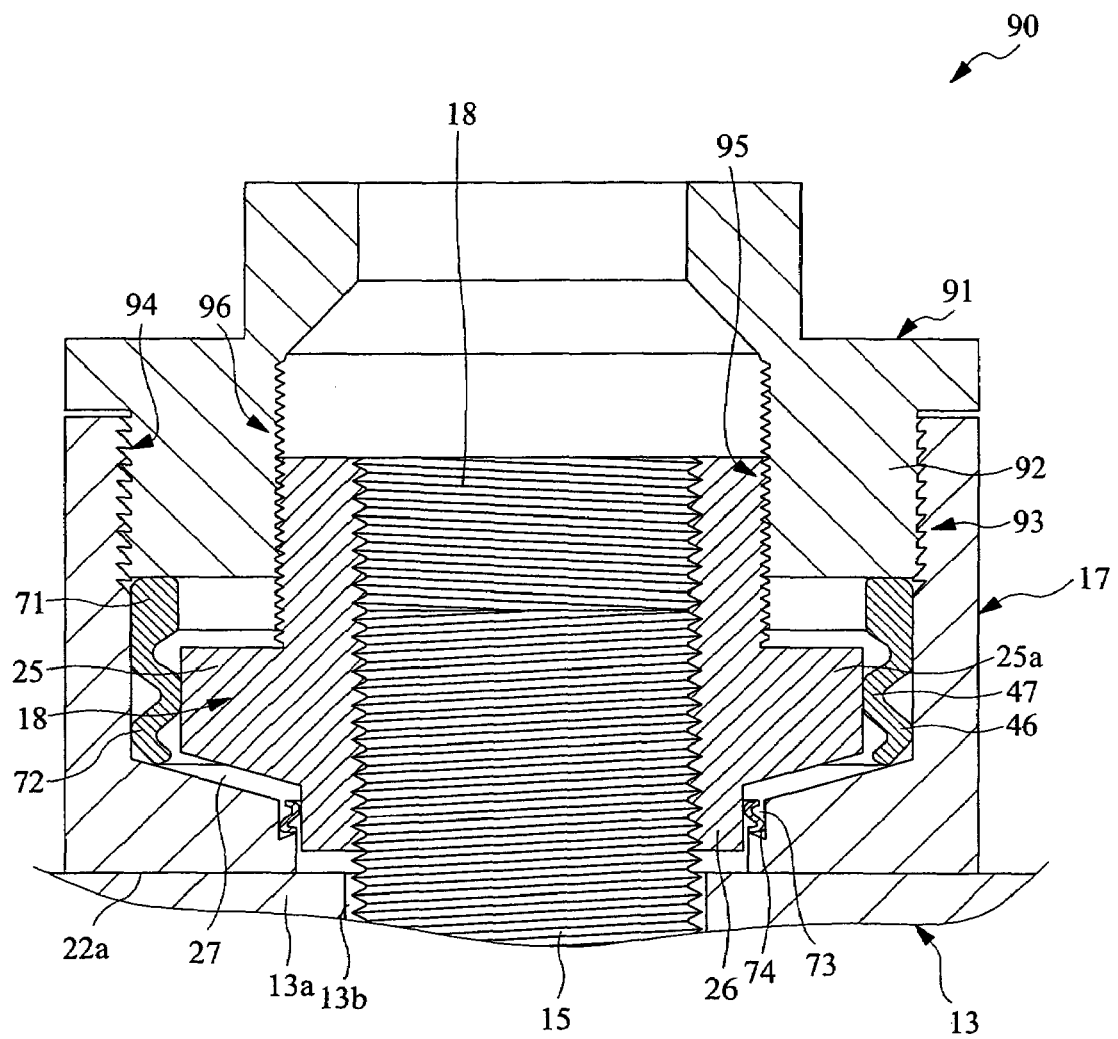
FIG. 13 is a cross-sectional view showing a modified example of the fluid pressure nut shown in FIG. 10.

FIG. 13 is a cross-sectional view showing a modified example of the liquid pressure nut shown in FIG. 10. In FIG. 13, members corresponding to the aforementioned members are denoted by the same reference numeral.

The fluid pressure nut 60 shown in FIG. 10 applies a tensile force to the bolt 15 by supplying the oil pressure to the load input pressure chamber 63. In contrast, by rotating a fastening screw portion 91, a liquid pressure nut 90 shown in FIG. 13 pressurizes the working oil sealed into the pressure chamber 27 and, at the same time, axially moves the second load supporting member 18 so as to apply the tensile force to the bolt 15.

The fastening screw portion 91 has a cylindrical portion 92 disposed between the first load supporting member 17 and the second load supporting member 18. A large-diameter male screw portion 94 screw-fastened on a large-diameter female screw portion 93 formed in the inner circumferential surface of the first load supporting member 17 is formed in the outer circumferential peripheral surface of the cylindrical portion 92. A small-diameter female portion 96 screw-fastened on a small-diameter male screw portion 95 formed in the outer circumferential surface of the second load supporting member 18 is formed in the inner circumferential surface thereof. The large-diameter female screw portion 93 and the small-diameter female screw portion 96 are screws directed to the same direction. The large-diameter male screw portion 94 has a first lead S1 corresponding to the large-diameter female screw portion 93, and the small-diameter female screw portion 96 has a second lead S2 corresponding to the small-diameter male screw portion 95. The second lead S2 is set larger than the first lead S1. For this reason, when the fastening screw member 91 is screwed into the first load supporting member 17, the second load supporting member 18 moves in a direction of separating from the first load supporting member 17 due to a lead difference between the large-diameter male screw portion 94 and the small-diameter female screw portion 96, that is, a tensile force is applied to the bolt 15 through the second load supporting member 18.

Further, a load transmission piston 71 is axially movable between the fastening screw member 91 and the pressure chamber 27, and an end surface thereof contacts with an end portion of the fastening screw portion 91. When the fastening screw member 91 is screwed into the first load supporting member 17, the seal ring 72 is pressed by the fastening screw member 91 through the load transmission piston 71. In other words, the pressure of working oil sealed into the pressure chamber 27 is increased by receiving the load from the fastening screw member 91, so that the second load supporting member 18 moves in a direction of separating from the first load supporting member 17, whereby a tensile force is applied to the bolt 15.

At this time, the first lead S1 of the large-diameter male screw portion 94 and the second lead S2 of the small-diameter female screw portion 96 are set to become:

$$A1/A2 \leq (S2-S1)/S1$$

with respect to a pressure receiving area A1 of the load transmission piston 71 and a pressure receiving area A2 of a piston portion 25a. The tensile force applied to the bolt 15 by pressing the seal ring 72 through the load transmission piston 71 and the tensile force applied to the bolt 15 by directly transmitting the rotation of the fastening screw member 91 to the second load supporting member 18 through the small-diameter female screw portion 96 are synchronized or the tensile force applied to the bolt 15 through the small-diameter female screw portion 96 is allowed to exceed the tensile force transmitted to the bolt 15 through the load transmission piston 71 and the seal ring 72. Due to this, the tensile force applied to the bolt 15 by the rotation of the fastening screw member 91 is dispersed into a load by pressurization of the pressure chamber 27 and a load directly applied to the second load supporting member 18 from the fastening screw member 91, so that the loads of the seal rings 72 are 74 are reduced and the operation of the fluid pressure nut 90 can be made more reliable.

Figure 14:
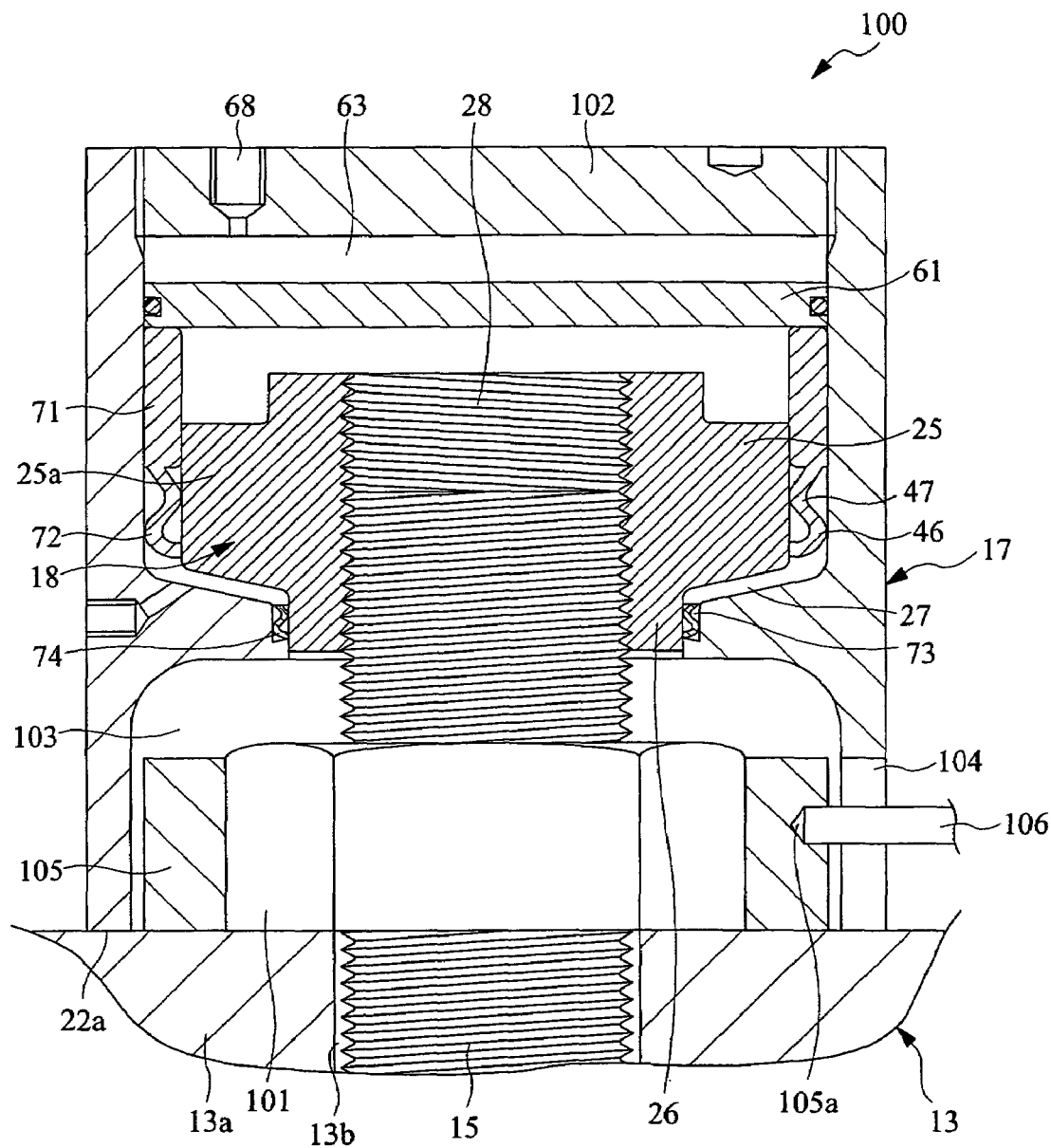
FIG. 14 is a cross-sectional view showing the detail of a bolt tensioner according to another embodiment of the present invention.

FIG. 14 is a cross-sectional view showing the detail of a bolt tensioner according to another embodiment of the present invention. In FIG. 14, members corresponding to the aforementioned members are denoted by the same reference numerals.

A bolt tensioner 100 as a liquid pressure device shown in FIG. 14 applies a tensile force to the bolt 15 in advance in screw-fastening a nut 101 on the bolt 15 for fastening the upper case 13, and has basically the same structure as that of the fluid pressure nut 60 shown in FIG. 10.

The first load supporting member 17 provided in the bolt tensioner 100 is formed in a bottomed cylindrical shape with a ceiling wall portion 102, and is disposed in the upper case 13 in its fastening surface 22a. A load input piston 61 is formed in a disk shape axially movably and slidably contacting with the inner circumferential surface of the first load supporting member 17, and a load input pressure chamber 63 is partitioned and formed by the ceiling wall portion 102 of the first load supping member 17 and the load input piston 61. Consequently, the pressure receiving area of the load input piston 61 occupies the entire interior of the first load supporting member 17, so that even when the oil pressure supplied to the load input pressure chamber 63 is set low, a desired tensile force can be applied to the bolt 15.

Further, in this bolt tensioner 100, a nut accommodating portion 103 is formed in the first load supporting member 17 between the second load supporting member 18 and the upper case 13, and a nut 101 is slightly screw-connected in advance to the bolt 15 to which the tensile force is applied by this bolt tensioner 100. Further, the nut accommodating portion 103 is provided with a window portion 104, whereby the fastening etc. of the nut 101 can be performed through the window portion 104. At this time, to easily fasten the nut 101, a nut adaptor 105 is fitted in the nut 101. This nut adaptor 105 is provided with an engaging hole 105a engaged with a handle 106 in its outer circumferential surface, and can rotate the nut 101 through the handle 106.

In such a bolt tensioner 100, when the oil pressure is supplied to the load input pressure chamber 63, the seal ring 72 is pressed through the load transmission piston 71 by the load input piston 61, whereby the pressure of the working medium sealed into the pressure chamber 27 is increase. Therefore, the second load supporting member 18 moves in a direction of separating from the first load supporting member 17, whereby the tensile force is applied to the bolt 15.

When the tensile force is applied to the bolt 15, the bolt 15 extends axially and the nut 101 moves together with the bolt 15 in a direction of separating from the upper case 13, whereby the gap between the nut 101 and the upper case 13 is created. In this state, the nut 101 can be freely rotated, and when the handle 106 is inserted from the window portion 104 and the nut 101 is again fastened on the upper case 13, the gap created between the upper case 13 and the nut 101 is eliminated and the nut 101 is in a state of being tangent to the upper case 13. Next, when the oil pressure supplied to the load input pressure chamber 63 is exhausted from this state and the tensile force applied to the bolt 15 is released, the bolt 15 axially shrinks. Therefore, the nut 101 is fastened while applying an axial force to the bolt 15. By this axial force of the bolt 15, the nut 101 is strongly brought into contact with the upper case 13, whereby the slack of the fastening is prevented. Then, when the fastening by the nut 101 and the bolt 15 is completed, this bolt tensioner 100 is detached from the upper case 13.

Figure 15:
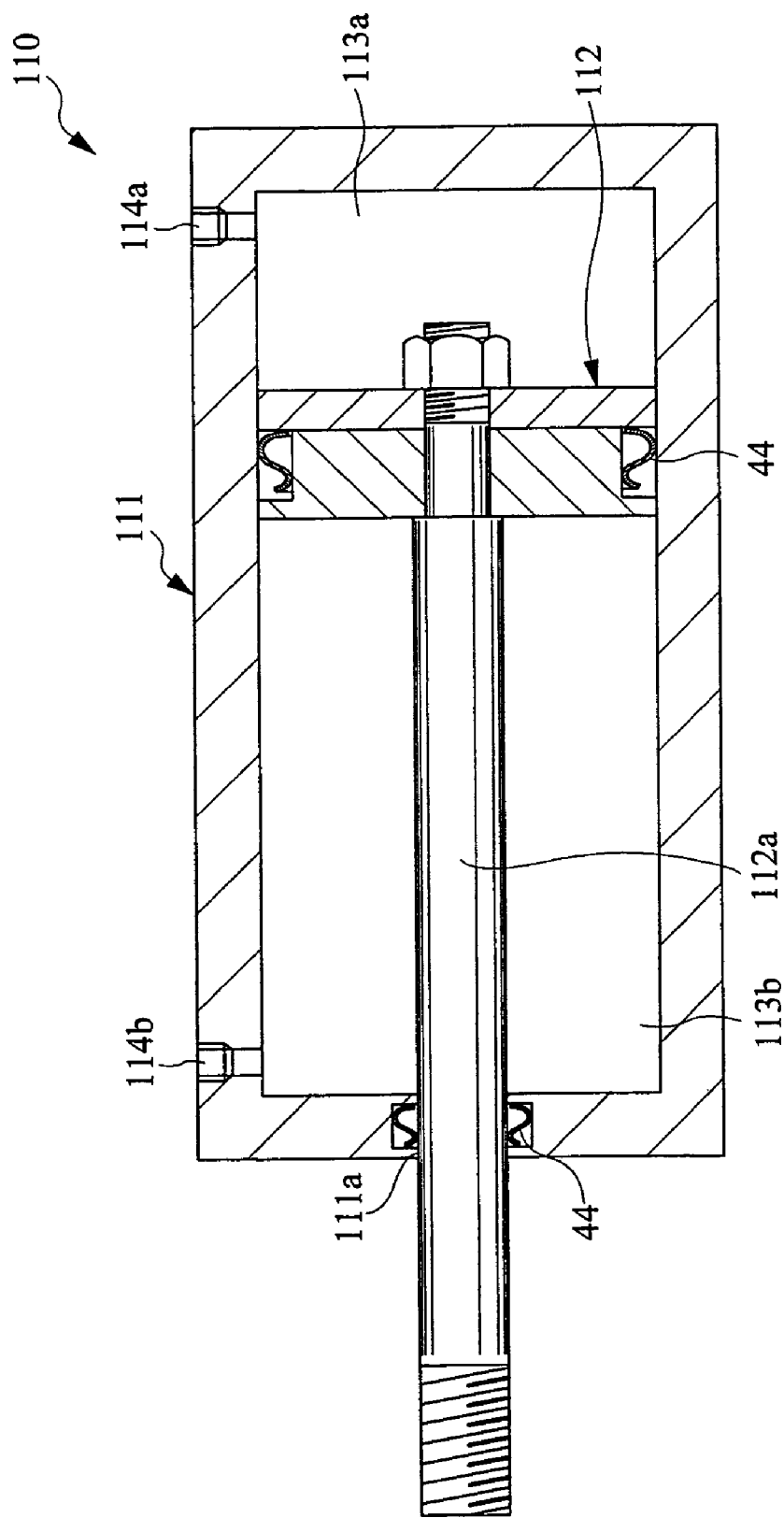
FIG. 15 is a cross-sectional view showing a fluid pressure actuator according to another embodiment of the present invention.

Needless to say, the present invention is not limited to the foregoing embodiments, and may be variously modified and altered without departing from the gist thereof. For example, in the foregoing embodiments, although this fluid pressure nut 16 is used for assembling the turbine case 12, it is not limited to this and may be used for fastening other members to be fastened. Further, if energy of the working medium can be converted into mechanical energy, for example, the fluid pressure actuator 110 etc. as shown in FIG. 15 may be used. In this case, the fluid pressure actuator 110 is constituted so that the piston 112 serving as the second load supporting member is axially and relatively movably accommodated in a cylinder 111 serving as the first load supporting member, and the oil pressure as a working media is supplied to pressure chambers 113a and 113b partitioned and formed by the cylinder 111 and the piston 112 from the supply/exhaust ports 114a and 114b formed in the cylinder 111, respectively. The seal ring 44 positioned between the cylinder 11 and the piston 112 and being similar to that as shown in FIG. 7 is attached to the outer circumferential surface of the piston 112, whereby the oil pressure is prevented from leaking from the sliding portion of the cylinder 111 and the piston 112. Further, the piston rod 112a protruding externally from a pass-through hole 111a of the cylinder 111 is provided to the piston 112, whereby the oil pressure is prevented from leaking from the sliding portion of the pass-through hole 111a and the piston rod 112a.

Further, in the aforementioned embodiments, although the first load supporting member 17, the second load supporting member 18, and the lock ring 21 are made of steel materials, they are not limited to those materials. If having a predetermined strength and being able to endure a predetermined thermal load, other metallic material etc. may be used for forming these members.

Further, in the aforementioned embodiments, although the lock ring 21 is provided on the outer circumferential surface of the second load supporting member 18, it is not limited to this and may be provided in the outer circumferential surface of the first load supporting member 17. In this case, the load supporting surface 21a is tangent to the end surface of the second load supporting member 18.

Further, in the aforementioned embodiments, although the working oil is used as the working medium, it is not limited to this and may be a medium with non-compressibility and fluidity such as water.

Further, in the aforementioned embodiments, although the seal ring 44 is such that the first curve portion 46 strongly brought into contact with the first load supporting member 17 through the cooling fit, it is not limited to this and may be attached by performing shrinkage fit to the seal ring 44 in order to make one of the curve portions further from the pressure chamber 27 strongly contact with the first load supporting member 17 or second load supporting member 18.

Figure 16:
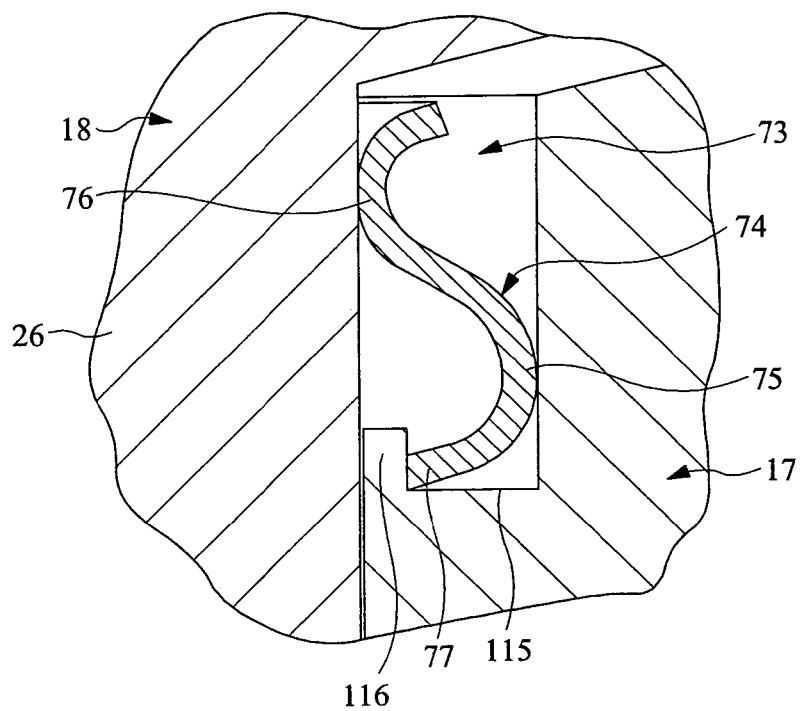
FIG. 16 is a cross-sectional view showing a modified example of a stopper surface shown in FIG. 11.

Further, although the stopper surface 73a is inclined and formed in the case of being shown in FIG. 11, as shown in FIG. 16, a stopper surface 115 may be provided with a restriction wall portion 116 axially protruding from the stopper surface 115. In this case, since the stopper portion 77 abuts on the restriction wall portion 116 and its radial movement is restricted, the seal ring 74 is deformed by the oil pressure in a direction of pressing the first curve portion 75 to the first load supporting member 17, by regarding the stopper portion 77 as a supporting point, whereby the sealing force of this seal ring 74 is increased.

Figure 17:
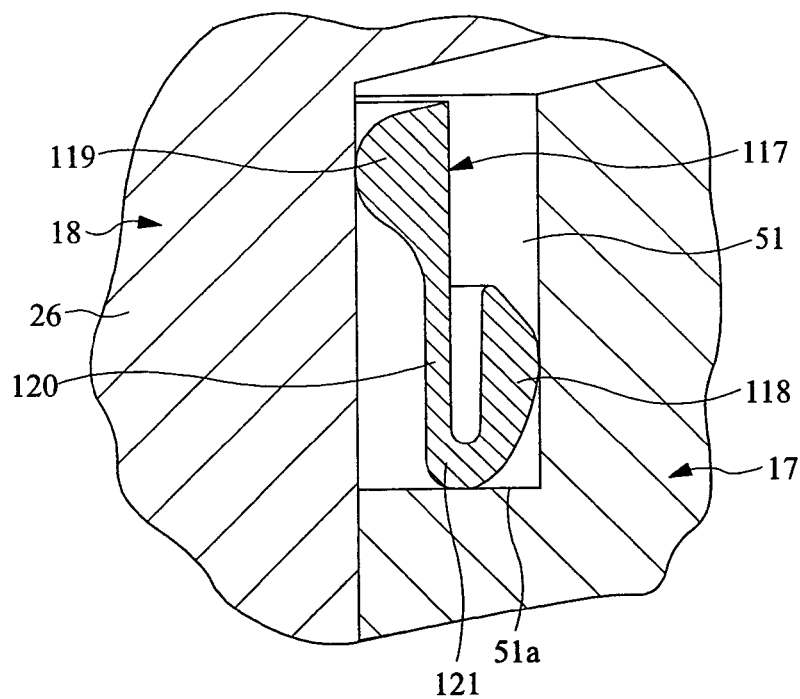
FIG. 17 is a cross-sectional view showing a modified example of the seal ring shown in FIG. 7.

Further, in the aforementioned embodiments, although the seal ring 44 is formed in an S-sectional shape, it is not limited to this and, for example, as shown in FIG. 17, it may be a seal ring 117 formed in a substantially J-sectional shape. In this case, the first curve portion 118 contacting with the first load supporting member 17 and the second curve portion 119 contacting with the second load supporting member 18 are axially shifted and provided, and a pressure receiving portion 120 continuing into the first curve portion 118 and the second curve portion 119 is formed in a cylindrical shape extending in parallel to the axial direction from the second curve portion 119. Further, the stopper portion 121 is curved and formed so as to continue into the first curve portion 118 and the pressure receiving portion 120, and the pressure receiving portion 120 and a rear surface of the first curve portion 118 are opposed to each other. For this reason, when the pressure in the pressure chamber 27 is increased, this seal ring 117 is deformed in a tapered shape by regarding the stopper portion 121 as a supporting point due to the pressure applied to the pressure receiving portion 120 and the second curve portion 119 is strongly brought into contact with the second load supporting member 18. At the same time, the pressure is applied to a rear surface of the first curve portion 118 and, due to this pressure, the first curve portion 118 is strongly brought into contact with the first load supporting member 17.

The present invention can be applied to the case of assembling a turbine case of a steam turbine or gas turbine used in a power plant such as a power plant station by preliminarily applying a tensile force to a bolt by fluid pressure.

The invention claimed is:

1. A fluid pressure device for converting energy of a working medium supplied to an interior of a pressure chamber into mechanical energy, the device comprising:
   a first load supporting member;
   a second load supporting member relatively movably incorporated into said first load supporting member and partitioning and forming said pressure chamber together with said first load supporting member; and
   a metallic seal ring provided with a first curve portion contacting with said first loading supporting member, a first curve portion formed so as to be axially shifted relative to said first curve portion and contacting with said second load supporting member, and a pressure receiving portion continuing into said first and second curve portions and converting pressure applied by said working medium into radial-directional forces of said first and second curve portions, the metallic seal ring being disposed in an end portion of said pressure chamber;
   wherein an axial-directional one side of said seal ring is provided with a positioning stopper portion contacting with a stopper surface formed in said first load supporting member or said second load supporting member; and
   wherein an angle formed by said stopper surface and a straight line, which passes through a contact point between the curve portion axially further from said stopper portion in said first and second curve portions and said first or second load support portion and a contact point between said stopper portion and said stopper surface, is set to be smaller than an axial-directional angle of said straight line.

2. The fluid pressure device according to claim 1, wherein said stopper surface is inclined in the same direction as that of a straight line, which passes through a contact point between said first curve portion and said first load supporting member and a contact point between the second curve portion and said second load supporting member.

3. The fluid pressure device according to claim 1, wherein a restriction wall portion for restricting a radial-directional movement of said stopper portion is provided in said stopper surface.

4. The fluid pressure device according to claim 1, wherein said seal ring is subjected to shrinkage fit or cooling fit so that the curve portion axially further from said first curve portion and said second curve portion is strongly brought into contact with said first or second load supporting member.

5. A liquid pressure device screw-connected in a state of applying a tensile force in advance to a bolt inserted into an insertion hole of a member to be fastened, the device comprising:
   a first load supporting member disposed in said member to be fastened;
   a second load supporting member having a screw hole screw-connected to said bolt and axially movably incorporated into said first load supporting member to partition and form a pressure chamber, to which a working medium is supplied, together with said first load supporting member; and a metallic seal ring provided with a first curve portion contacting with said first load supporting member, a second curve portion formed so as to be axially shifted to said first curve portion and contacting with said second load supporting member, and a pressure receiving portion continuing into said first and second curve portion and converting pressure applied to said working medium into radical-directional forces of said first and second curve portions, the metallic seal ring being disposed in an end portion of said pressure chamber;

wherein an axial-directional one side of said seal ring is provided with a positioning stopper portion contacting with a stopper surface formed in said first load supporting member or said second load supporting member; and wherein an angle formed by said stopper surface and a straight line, which passes through a contact point between the curve portion axially further from said stopper portion in said first and second curve portions and said first or second load support portion and a contact point between said stopper portion and said stopper surface, is set to be smaller than an axial-directional angle of said straight line.

6. The fluid pressure device according to claim 5, further comprising:
a female screw portion screw-connected to a male screw portion provided on an outer circumferential surface of one of said first and second load supporting members;
a load supporting surface contacting with an end surface of the other of said first and second load supporting members,
wherein a lock ring for supporting a load of said second load supporting member is provided.

7. The fluid pressure device according to claim 6, wherein a flank on a load supporting side of said male screw portion is inclined in a direction of approaching said load supporting surface from a root portion to a crest portion, and a flank on a load supporting side of said female screw portion is inclined in a direction of separating from said load supporting surface from the root portion to the crest portion.

8. The fluid pressure device according to claim 6, wherein said lock ring is radially divisibly provided.

9. The fluid pressure device according to claim 5, wherein by supplying a working medium to said pressure chamber, said second load supporting member moves in a direction of separating from said first load supporting member and a tensile force is applied to said bolt.

10. The fluid pressure device according to claim 5, further comprising:
a load input piston axially slidably provided between an inner circumferential surface of said first load supporting member and an outer circumferential surface of said second load supporting member, and partitioning and forming a load input pressure chamber together with an reactive force supporting portion provided in said second load supporting member; and
a load transmission piston formed in a cylindrical shape slidably contacting with the inner circumferential surface of said first load supporting member and the outer circumferential surface of said second load supporting member and being axially movable between said load input piston and said pressure chamber,
wherein by supporting a load input working medium to said load input pressure chamber, a tensile force is applied to said bolt through said reactive force supporting portion and concurrently said seal ring is pressed to said load input piston through said load transmission piston to increase pressure of a working medium sealed into said pressure chamber.

11. The fluid pressure device according to claim 10, wherein a large-diameter cylindrical portion in which said screw hole is formed and a small-diameter column portion formed smaller in diameter than said large-diameter cylindrical portion are provided in said second load supporting member, and said load input piston slidably contacts with the outer circumferential surface of said small-diameter column portion.

12. The fluid pressure device according to claim 10, wherein a pressure receiving area of said load transmission piston is set smaller than that of said second load supporting member.

13. The fluid pressure device according to claim 10, wherein said load transmission piston and said seal ring are integrally formed.

14. The fluid pressure device according to claim 5, further comprising:
a fastening screw member including a large-diameter male screw portion having a first lead corresponding to a large-diameter female screw portion formed in said first load supporting member and screw-connected to said large-diameter female screw portion, and a small-diameter female screw portion having a second lead larger than said first lead and screw-connected to a small-diameter male screw portion formed in said second load supporting member in the same direction as that of said large-diameter female screw portion; and
a load transmission piston formed in a cylindrical shape slidable contacting with the inner circumferential surface of said first load supporting member and the outer circumferential surface of said second load supporting member and being axially movable between said fastening screw member and said pressure chamber,
wherein by screwing said fastening screw member into said first load supporting member, a tensile force is applied to said bolt through said second load supporting member and concurrently said seal ring is pressed to said fastening screw member through said load transmission piston to increase pressure of a working medium sealed into said pressure chamber.

15. The fluid pressure device according to claim 14, wherein said load transmission piston and said seal ring are integrally formed.

16. The fluid pressure device according to claim 5, wherein said stopper surface is inclined in the same direction as that of a straight line, which passes through a contact point between said first curve portion and said first load supporting member and a contact point between the second curve portion and said second load supporting member.

17. The fluid pressure device according to claim 5, wherein a restriction wall portion for restricting a radial-directional movement of said stopper portion is provided in said stopper surface.

18. The fluid pressure device according to claim 5, wherein said seal ring is subjected to shrinkage fit or cooling fit so that the curve portion axially further from said first curve portion and said second curve portion is strongly brought into contact with said first or second load supporting member.

19. A liquid pressure device screw-connected to a nut and applying in advance a tensile force to a bolt which is screw-connected to the nut and fastening a member to be fastened, the device comprising:

a first load supporting member disposed in said member to be fastened;

a second load supporting member having a screw hole screw-connected to said bolt and axially movably incorporated into said first load supporting member to partition and form a pressure chamber together with said first load supporting member;

a load input piston formed in a disk shape axially movably slidably contacting with an inner circumferential surface of said first load supporting member, and partitioning and forming a load input pressure chamber together with said first load supporting member;

a load transmission piston formed in a cylindrical shape slidably contacting with the inner circumferential surface of said first load supporting member and the outer circumferential surface of said second load supporting member, and being axially movable between said load input piston and said pressure chamber; and a metallic seal ring formed so that a first curve portion contacting with said first load supporting member and a second curve portion contacting with said second load supporting member are axially shifted and formed, the metallic seal ring being disposed at an end portion of said pressure chamber, wherein a load input working medium is supplied to said load input pressure chamber, and said seal ring is pressed to said load input piston through said load transmission piston to increase pressure of the working mediums sealed into said pressure chamber.

20. The fluid pressure device according to claim 19, wherein a pressure receiving area of said load transmission piston is set smaller than that of said second load supporting member.

21. The fluid pressure device according to claim 19, wherein said load transmission piston and said seal ring are integrally formed.

22. The fluid pressure device according to claim 19, wherein a pressure receiving portion, continuing into said first and second curve portions and converting pressure applied by said working medium into radial-directional sealing forces of said first and second curve portions, is provided in said seal ring.

23. The fluid pressure device according to claim 19, wherein an axial-directional one side of said seal ring is provided with a positioning stopper portion contacting with a stopper surface formed in said first load supporting member or said second load supporting member.

24. The fluid pressure device according to claim 23, wherein an angle formed by said stopper surface and a straight line, which passes through a contact point between the curve portion axially further from said stopper portion in said first and second curve portions and said first or second load support portion and a contact point between said stopper portion and said stopper surface, is set to be smaller than an axial-directional angle of said straight line.

25. The fluid pressure device according to claim 23, wherein said stopper surface is inclined in the same direction as that of a straight line, which passes through a contact point between said first curve portion and said first load supporting member and a contact point between the second curve portion and said second load supporting member.

26. The fluid pressure device according to claim 23, wherein a restriction wall portion for restricting a radial-directional movement of said stopper portion is provided in said stopper surface.

27. The fluid pressure device according to claim 19, wherein said seal ring is subjected to shrinkage fit or cooling fit so that the curve portion axially further from said first curve portion and said second curve portion is strongly brought into contact with said first or second load supporting member.

28. A fluid pressure device for converting energy of a working medium supplied to an interior of a pressure chamber into mechanical energy, the device comprising:

a first load supporting member;

a second load supporting member relatively movably incorporated into said first load supporting member and partitioning and forming said pressure chamber together with said first load supporting member; and a lock ring including a female screw portion screw-connected to a male screw portion provided with an outer circumferential surface of one of said first and second load supporting members, and a load supporting surface contacting with an end surface of the other of said first and second load supporting members, the lock ring supporting a load of said second load supporting member, wherein said lock ring is radially divisibly provided.

29. The fluid pressure device according to claim 28, wherein a flank on a load supporting side of said male screw portion is inclined in a direction of approaching said load supporting surface from a root portion to a crest portion, and a flank on a load supporting side of said female screw portion is inclined in a direction of separating from said load supporting surface from the root portion to the crest portion.

30. A liquid pressure device screw-connected in a state of applying a tensile force in advance to a bolt inserted into an insertion hole of a member to be fastened, the device comprising:

a first load supporting member disposed in said member to be fastened;

a second load supporting member having a screw hole screw-connected to said bolt and axially movably incorporated into said first load supporting member to partition and form a pressure chamber together with said first load supporting member; and a lock ring including a female screw portion screw-connected to a male screw portion provided with an outer circumferential surface of one of said first and second load supporting members, and a load supporting surface contacting with an end surface of the other of said first and second load supporting members, the lock ring supporting a load of said second load supporting member, wherein said lock ring is radially divisibly provided.

31. The fluid pressure device according to claim 30, wherein a flank on a load supporting side of said male screw portion is inclined in a direction of approaching said load supporting surface from a root portion to a crest portion, and a flank on a load supporting side of said female screw portion is inclined in a direction of separating from said load supporting surface from the root portion to the crest portion.

* * * * *